US012672216B2

(12) United States Patent (10) Patent No.: US 12,672,216 B2
Pattipati et al. (45) **Date of Patent: *Jun. 30, 2026**

(54) PHYSICS-INFORMED PARTIAL LEAST SQUARES REGRESSION MODELING FOR FAILURE DETECTION IN POWER ELECTRONIC DEVICES

(71) Applicants: TOYOTA MOTOR ENGINEERING & MANUFACTURING NORTH AMERICA, INC., Plano, TX (US); University of Connecticut, Farmington, CT (US)

(72) Inventors: Krishna Pattipati, Farmington, CT (US); Muhamed K. Farooq, Ann Arbor, MI (US); Qian Yang, Farmington, CT (US); Ali Bazzi, Farmington, CT (US); Shailesh N. Joshi, Ann Arbor, MI (US); Hiroshi Ukegawa, South Lyon, MI (US)

(73) Assignees: TOYOTA MOTOR ENGINEERING & MANUFACTURING NORTH AMERICA, INC., Plano, TX (US); University of Connecticut, Farmington, CT (US)

( * ) Notice: Subject to any disclaimer, the term of this patent is extended or adjusted under 35 U.S.C. 154(b) by 1301 days.

This patent is subject to a terminal disclaimer.

(21) Appl. No.: 17/492,442

(22) Filed: Oct. 1, 2021

(65) Prior Publication Data

US 2023/0106360 A1 Apr. 6, 2023

(51) Int. Cl.
G06N 20/00 (2019.01)
G06N 3/08 (2023.01)
(Continued)

(52) U.S. Cl.
CPC ............. *H05B 45/325* (2020.01); *G06N 3/08* (2013.01); *G06N 20/00* (2019.01); *H05B 45/37* (2020.01)

(58) Field of Classification Search
CPC ...... H05B 45/325; H05B 45/37; G06N 20/00; G06N 3/08
See application file for complete search history.

(56) References Cited

U.S. PATENT DOCUMENTS 6,622,059 B1 9/2003 Toprac
7,260,501 B2 8/2007 Pattipatti
(Continued)

FOREIGN PATENT DOCUMENTS

CN 103246787 A 8/2013
CN 104880509 A 9/2015
(Continued)

OTHER PUBLICATIONS

Hayes et al., "A Closed Loop State Estimation Tool for MV Network Monitoring and Operation", Jul. 4, 2015, IEEE Transaction on Smart Grid, vol. 6 No. 4. pp. 2116-2125. (Year: 2016).*
(Continued)

*Primary Examiner* — Paulinho E Smith
(74) *Attorney, Agent, or Firm* — SHEPPARD, MULLIN, RICHTER & HAMPTON LLP; Daniel N. Yannuzzi

(57) ABSTRACT

Systems and methods are disclosed for performing fault detection and prediction for power electronics and switching devices for power electronics, such as power inverters. Systems and methods disclosed herein can include determining, by a partial least squares model that evaluates values for one or more switching parameters for a switching device, the one or more switching parameters selected from a first set of switching parameters, a predicted value for the on-state current $I_{ds}$ of the switching device. The predicted value (Continued)

for the on-state current $I_{ds}$ can be based on the values of the one or more switching parameters for the switching device. Systems and methods disclosed herein can determine a residual comprising the difference between the predicted value for the another switching parameter of the switching device and an actual value of the predicted value for the another switching parameter, and generate a test statistic based on the residual.

20 Claims, 20 Drawing Sheets

(51) Int. Cl.
H05B 45/325 (2020.01)
H05B 45/37 (2020.01)

(56) References Cited

U.S. PATENT DOCUMENTS

| | | | | |
|---|---|---|---|---|
| 7,271,608 | B1 * | 9/2007 | Vermeire | G01R 31/2879 |
| | | | | 340/653 |
| 10,393,795 | B2 | 8/2019 | Aeloiza | |
| 2008/0077340 | A1 * | 3/2008 | Nguyen | G06F 1/28 |
| | | | | 700/286 |
| 2010/0169030 | A1 | 7/2010 | Parlos | |
| 2013/0041554 | A1 | 2/2013 | Trunk | |
| 2018/0336534 | A1 * | 11/2018 | Kim | G06N 7/01 |
| 2019/0375421 | A1 | 12/2019 | Asher | |
| 2020/0064406 | A1 | 2/2020 | Ritzberger | |
| 2022/0011795 | A1 | 1/2022 | Rifani | |
| 2022/0120807 | A1 | 4/2022 | He | |
| 2022/0414539 | A1 * | 12/2022 | Oren | G06F 11/3447 |
| 2023/0104896 | A1 * | 4/2023 | Pattipati | G01R 31/3277 |
| | | | | 706/21 |
| 2023/0106360 | A1 * | 4/2023 | Pattipati | G06N 20/00 |
| | | | | 315/307 |
| 2023/0229220 | A1 | 7/2023 | Suryanarayana | |

FOREIGN PATENT DOCUMENTS

| | | |
|---|---|---|
| CN | 108444942 A | 8/2018 |
| CN | 109782176 A | 5/2019 |
| CN | 110082682 B | 4/2020 |
| DE | 102008021556 A1 | 11/2009 |

OTHER PUBLICATIONS

Xu et al., "Power Loss Prediction for Aging Characteristics and Condition Monitoring for Parallel-Connected Power Modules Using Nonlinear Autoregressive Neural Network", 2019, Wiley Hindawi, vol. 2019, Aricle ID 8759873, pp. 1-10. (Year: 2019).*

Chetouani, Use of Cumulative Sum (CUSUM) Test for Detecting Abrupt Changes in the Process Dynamics, International Journal of Reliability, Quality and Safety Engineering vol. 14, No. 01, pp. 65-80, 2007.

Xu, Shengyou, et al. "Power Loss Prediction for Aging Characteristics and Condition Monitoring for Parallel-Connected Power Modules Using Nonlinear Autoregressive Neural Network." Complexity 2019.1 (2019): 8759873. (Year: 2019).

Hayes, Barry P., Jorn K. Gruber, and Milan Prodanovic. "A closed-loop state estimation tool for MV network monitoring and operation." IEEE Transactions on Smart Grid 6.4 (2014): 2116-2125. (Year: 2014).

Xie, Hang, Hao Tang, and Yu-He Liao. "Time series prediction based on NARX neural networks: An advanced approach." 2009 International conference on machine learning and cybernetics. vol. 3. IEEE, 2009. (Year: 2009).

Zhao, Shuai, Frede Blaabjerg, and Hual Wang. "An overview of artificial intelligence applications for power electronics." IEEE Transactions on Power Electronics 36.4 (2020): 4633-4658. (Year: 2020).

Ahsan, Mominul, Stoyan Stoyanov, and Chris Bailey. "Data driven prognostics for failure of power semiconductor packages." 2018 41st International Spring Seminar on Electronics Technology (ISSE). IEEE, 2018. (Year: 2018).

Ni, Junkang, et al. "Remaining useful life prediction method for mosfet based on time series model." 2021 IEEE Asia-Pacific Conference on Image Processing, Electronics and Computers (IPEC). IEEE, 2021. (Year: 2021).

* cited by examiner

PHYSICS-INFORMED PARTIAL LEAST SQUARES REGRESSION MODELING FOR FAILURE DETECTION IN POWER ELECTRONIC DEVICES

CROSS REFERENCE TO RELATED APPLICATION

The present application is related to co-pending and co-owned U.S. patent application Ser. No. 17/492,391, filed on Oct. 1, 2021, titled "NONLINEAR AUTOREGRESSIVE EXOGENOUS (NARX) MODELLING FOR POWER ELECTRONIC DEVICE MODELLING," which is incorporated herein by reference in its entirety.

TECHNICAL FIELD

The present disclosure relates generally to systems and methods for predicting or anticipating failures in power electronics devices such as switching devices.

DESCRIPTION OF RELATED ART

Electric vehicles (EVs) have a number of advantages over traditional gas powered automobiles in terms of efficiency, fuel economy, flexible charging, energy security, and beneficial impact on climate due to reduction in emissions.

Power electronics (PEs) may rely on electronic circuits such as AC (Alternating Current) to DC (Direct Current) converters (also known as rectifiers), DC to AC converters (also known as inverters), impedance matching circuits, and other power electronics to condition, monitor, maintain, and/or modify the characteristics of the voltage and/or current used to provide power to electronic devices. For example, in the case of inverters, these power electronics may include electrical switches (e.g. as full or half-bridge formations) that switch DC power to form an AC power signal.

In the context of EVs, PE devices, such as inverters and DC/DC converters, control the flow of electrical energy in EVs and/or in ground support equipment. The AC power may be used by an electric motor of an electric vehicle, for example. Electronic circuits for power electronics may include one or more switching devices such as transistors. Bipolar junction transistors (BJTs) are common in low current and/or low frequency switching applications. Metal-oxide-semiconductor field-effect transistors (MOSFETs) are common in high power and/or frequency applications.

Power electronic devices may operate at high temperatures and/or power levels, which can lead to failure. There are several different types of failures. Some examples are a short circuit, an open circuit, or gate current leakage.

Consequently, the reliability of PE components, such as insulated-gate bipolar transistors (IGBT) and MOSFET, is becoming a major concern to motor manufacturers because unscheduled maintenance ensues when faults occur in these devices.

BRIEF SUMMARY OF THE DISCLOSURE

As alluded to above, power electronic devices may operative at high temperatures and/or power levels. Monitoring and controlling such switching devices to avoid damage, for example in high temperatures and/or power levels can be challenging. Therefore, it is beneficial to develop fault detection, diagnosis and prognosis (FDDP) techniques that annunciate incipient device faults for proactive maintenance and increased vehicle availability. Anomaly detection is the first step in ensuring the operational integrity of PE devices. Incipient detection of anomalies can prevent unplanned vehicle breakdowns, increase vehicle availability, and lower the maintenance costs to vehicle owners.

It is therefore desirable to determine the health status of power electronic devices so that they may be replaced before failure. Thus, is desirable to predict when and how such failures will occur. The present disclosure includes systems and methods for predicting and/or preventing failure modes in power electronic devices. One purpose of embodiments of the present disclosure is to accurately predict how and/or when a power electronic device will fail.

Aspects of the present disclosure may be useful for predicting and/or detecting faults of systems and/or devices (not limited to PE devices) that may exhibit nonlinear behavior and/or responses and complex and variety in respective failure mechanisms. Aspects of the present disclosure may be useful for predicting and/or detecting faults of devices where multiple types of sensed data may be associated to predicting faults. Systems, methods, computer-readable media, techniques, and methodologies are disclosed for performing fault detection and prediction for power electronics and switching devices for power electronics.

According to various embodiments of the disclosed technology, a system is disclosed that includes at least one memory storing machine-executable instructions and at least one processor configured to access the at least one memory and execute the machine-executable instructions to perform a set of operations. The set of operations can include determining, using a machine learning model, a prediction for a value of a first switching parameter of a switching device. In embodiments, the prediction can be based on the present value of a second switching parameter of a switching device and a prior value of the first switching parameter.

In embodiments, the set of operations can include determining a residual comprising the difference between the prediction and an actual value of the switching parameter. In embodiments, the set of operations can include generating a test statistic based on the residual. In embodiments, the set of operations can include comparing the test statistic to a first threshold value.

In embodiments, the first switching parameter is at least one of drain-source voltage Vds, drain-source current Ids, case temperature for the switching device Tc, or drain-source resistance Rds. In embodiments, the first switching parameter can be drain-source resistance Rds and the second switching parameter can be gate source voltage Vgs. In embodiments, the residual can be a time-series. The test statistic can be generated by performing a cumulative sum (CUSUM) test on the variance of the residual.

In embodiments, the set of operations can include detecting the on-state median values for the first switching parameter. In embodiments, the prediction for the value of the first switching parameter of the switching device can be based on values for the on-state median for the first switching parameter. The set of operations can include removal of outlier values, e.g. of on-state median values. In embodiments, the prediction can be based on values for the on-state median for the first switching parameter after removal of outlier values.

In embodiments, the prediction for the value of the first switching parameter can be based on a prior value of a third switching parameter. In embodiments, the first switching parameter can be the drain-source resistance and the third switching parameter can be the drain-source voltage. The set of operations can include detecting the on-state median values for the first and third switching parameters. In embodiments, the prediction for the value of the first switching parameter can be based on values for the on-state medians of the first and third switching parameter.

The set of operations can include generating a signal based on the comparison of the test statistic to the first threshold value, wherein the signal is indicative of the onset of a fault at the switching device. The set of operations can include updating the machine learning model based on the signal indicative of the onset of a fault at the switching device.

In embodiments, the first parameter can be drain source resistance Rds, the second parameter can be gate source voltage Vgs. In embodiments, the prediction for the value of the first switching parameter can be based on prior values for a drain current Ids.

In embodiments, the machine learning model can be a nonlinear autoregressive exogenous model.

According to various embodiments of the disclosed technology, a system is disclosed for predicting failure of a power inverter of an electric or hybrid vehicle. The system can include at least one memory storing machine-executable instructions and at least one processor configured to access the at least one memory and execute the machine-executable instructions to perform a set of operations.

The set of operations can include determining using a machine learning algorithm implementing a nonlinear autoregressive exogenous model, a prediction for a value of a first switching parameter of a switching device of the power inverter of the vehicle. The prediction can be based on the present value of a second switching parameter of a switching device and a prior value of the first switching parameter. The set of operations can include determining a residual comprising the difference between the prediction and an actual value of the switching parameter. The set of operations can include generating a test statistic based on the residual. The set of operations can include comparing the test statistic to a first threshold value.

The set of operations can include generating a signal based on the comparison of the test statistic to the first threshold value. The signal can be indicative of the onset of a fault at the switching device.

In embodiments, the first switching parameter can be drain-source resistance Rds and the second switching parameter can be gate source voltage Vgs. In embodiments, the prediction can further based on a prior value of a drain current Ids.

According to various embodiments of the disclosed technology, a method for predicting faults in switching devices is disclosed. In various embodiments, the method can include determining, by applying a nonlinear autoregressive exogenous machine learning model, a predicted value at a first timestep for a switching parameter selected from a first set of switching parameters.

In embodiments, the predicted value for a switching parameter can be based on values for at least one switching parameter selected from the first set, the values taken prior to the first timestep. In embodiments, the predicted value for the switching parameter can be based on a value of another switching parameter not part of the first set of switching parameters, the value of the another switching parameter taken at the first timestep.

In embodiments, the method can include generating a residual corresponding to the difference between the determined predicted value and a measured value at the first timestep for the switching parameter selected from the first set. In embodiments, the method can include performing a statistical test on a series of residuals. The residuals can be generated by sequentially performing the determining and generating steps at sequential time points.

In embodiments, the first set of switching parameters can include drain-source resistance Rds of the switching device. In various embodiments, the another switching parameter can be gate source voltage Vgs of the switching device. In various embodiments, the test statistic is generated by performing a cumulative sum (CUSUM) test on the variance of the series of residuals.

The method can include determining the presence of a fault in the switching device based on the result for the statistical test as compared to a threshold value.

According to various embodiments of the disclosed technology, a system is disclosed that includes at least one memory storing machine-executable instructions and at least one processor configured to access the at least one memory and execute the machine-executable instructions to perform a set of operations. The system can be for predicting faults in switching devices. The set of operations can include determining by a first machine learning-model that evaluates values for one or more switching parameters for a switching device selected from a first set of switching parameters, a predicted value for another switching parameter of the switching device. The set of operations can further include determining a first residual that can include the difference between the prediction for the predicted value of the another switching parameter and an actual value of the another switching parameter. The set of operations can further include generating a first test statistic based on the first residual. The set of instructions can further include generating an anomaly signal based on the generated first test statistic.

In various embodiments, the another switching parameter, for which the value is predicted can be the on-state current $I_{ds}$ for the switching device. The value for the on-state current $I_{ds}$ can be predicted using the values of at least one of body-diode voltage $V_{bd}$, voltage between drain and source $V_{ds}$, and squared voltage between gate and source $V^2_{gs}$. As such, the set of operations can include predicting the on-state current $I_{ds}$ using the values of at least one of body-diode voltage $V_{bd}$, voltage between drain and source $V_{ds}$, and squared voltage between gate and source $V^2_{gs}$.

In various embodiments, the first residual can be part of a time-series of residuals. The operations can further include generating the test statistic by performing a cumulative sum (CUSUM) test on the mean of the residuals in the time-series.

In various embodiments, the another switching parameter for which the predicted value is predicted, can be the on-state current $I_{ds}$ for the switching device. The set of operations can include determining, by a second machine learning model, a prediction for a value of a drain-source resistance $R_{ds}$ of the switching device. In embodiments, the second machine learning model can be a nonlinear autoregressive exogenous model. The prediction for the drain-source resistance $R_{ds}$ can be based on the present value of another switching parameter of the switching device and a prior value of $R_{ds}$. The set of operations can further include determining a second residual comprising the difference between the prediction for the value of $R_{ds}$ and an actual value of $R_{ds}$. The set of operations can further include generating a second test statistic based on the residual for $R_{ds}$. The set of operations can further include generating the anomaly signal based on the first test statistic and the second test statistic.

In various embodiments, the set of operations can further include determining on-state values for the one or more switching parameters for the switching device selected from the first set of switching parameters. In various embodiments, the set of operations can include selecting the one or more switching parameters from the first set of switching parameters. The selected one or more switching parameters can be used by the first machine learning model. In various embodiments, the set of operations include dynamic programming based feature selection. The selected one or more switching parameters can be selected by physics informed dynamic programming based feature selection. In embodiments, the set of operations for physics informed dynamic programming based feature selection can include determining the number of switching parameters in the first set of switching parameters.

The set of operations for physics informed dynamic programming based feature selection can include determining the number of switching parameters in the first set of switching parameters. The set of operations for physics informed dynamic programming based feature selection can include evaluating the effectiveness of subsets of switching parameters from the first set of switching parameters, the subsets of switching parameters having a subset size equal to the number of switching parameters in the first set of switching parameters less i. In embodiments, the set of operations for physics informed dynamic programming based feature selection can include deleting the switching parameter resulting in the least decrease in effectiveness.

In various embodiments, the set of operations for physics informed dynamic programming based feature selection can include evaluating the effectiveness of subsets of switching parameters from the first set of switching parameters. In some embodiments, the subsets of switching parameters can have a subset size equal to the number of switching parameters in the first set of switching parameters less (i+1). In some embodiments, the set of operations for physics informed dynamic programming based feature selection can include selecting the switching parameters to be used by the first machine learning model based on the effectiveness of the subsets of switching parameters from the first set of switching parameters.

In various embodiments, the first machine learning model is a partial least squares regression model.

According to various embodiments of the disclosed technology, a method for predicting faults in switching devices is disclosed. The method can include determining, by a machine learning based model that evaluates values for one or more switching parameters for a switching device selected from a first set of switching parameters, a predicted value for another switching parameter of the switching device. The method can further include determining a first residual comprising the difference between the predicted value for the another switching parameter of the switching device and an actual value of the predicted value for the another switching parameter.

In various embodiments, the method can include generating a first test statistic based on the first residual. In embodiments, the method can include generating an anomaly signal related to the presence of a fault in the switching device based on the first test statistic.

In various embodiments, the another switching parameter for which the value is predicted, can be the on-state current $I_{ds}$ for the switching device. In some of these various embodiments, the value for the on-state current $I_{ds}$ can be predicted using the values of at least one of body-diode voltage $V_{bd}$, voltage between drain and source $V_{ds}$, and squared voltage between gate and source $V^2_{gs}$.

In various embodiments, the first residual is part of a time-series of residuals. In embodiments, the first test statistic can be generated by performing a cumulative sum (CUSUM) test on the mean of the residuals in the time-series. In some embodiments, the anomaly signal is generated based on the generated first test statistic.

In various embodiments, the another switching parameter, for which the predicted value is predicted, is the on-state current $I_{ds}$ for the switching device. In some embodiments, the method can include determining, using a second machine learning model, a prediction for a value of a drain-source resistance $R_{ds}$ of the switching device, wherein the prediction for the drain-source resistance is based on the present value of another switching parameter of the switching device and a prior value of $R_{ds}$. In some embodiments, the method can include determining a second residual for $R_{ds}$ comprising the difference between the prediction and an actual value of $R_{ds}$. In some embodiments, the method can further include generating a second test statistic based on the residual for Rds. In some embodiments, the method can further include determining the fault in the switching device based on the first test statistic and the second test statistic.

In various embodiments, the another switching parameter, for which the value is predicted, is the on-state current $I_{ds}$ for the switching device. In various embodiments, the method can include using a second machine learning model, a prediction for a value of a drain-source resistance $R_{ds}$ of the switching device, wherein the prediction for the drain-source resistance $R_{ds}$ is based on the present value of another switching parameter of the switching device and a prior value of the drain source resistance $R_{ds}$.

In embodiments, the method can include determining a second residual for $R_{ds}$ comprising the difference between the prediction and an actual value of $R_{ds}$. The method can include generating a second test statistic based on the residual for $R_{ds}$. In embodiments, the method can include updating the first machine learning model based on a comparison of the second test statistic to a threshold value. In embodiments, the predicted value for the another switching parameter of the switching device can be determined based on on-state values for the one or more switching parameters for the switching device, the one or more switching parameters selected from the first set of switching parameters.

In various embodiments, the method can include determining the number of switching parameters in the first set of switching parameters. In embodiments, the method can include evaluating the effectiveness of subsets of switching parameters from the first set of switching parameters. In some embodiments, the subsets of switching parameters can have a subset size equal to the number of switching parameters in the first set of switching parameters less i.

In embodiments, the method can include deleting the switching parameter resulting in the least decrease in effectiveness. The method can include evaluating the effectiveness of subsets of switching parameters from the first set of switching parameters, the subsets of switching parameters having a subset size equal to the number of switching parameters in the first set of switching parameters less (i+1). In embodiments, the method can include selecting the one or more switching parameters for the switching device to be used by the first machine learning model based on the effectiveness of the subsets of switching parameters from the first set of switching parameters.

In embodiments, the one or more switching parameters for the switching device selected from the first set of switching parameters, include body-diode voltage $V_{bd}$, voltage between drain and source $V_{ds}$, and squared voltage between gate and source $V^2_{gs}$. In embodiments, the another switching parameter, for which the value is predicted, is the on-state current $I_{ds}$ for the switching device.

According to various embodiments of the disclosed technology, a method for predicting faults in power inverters of electric or hybrid vehicles is disclosed. The method can include determining, by a partial least squares model that evaluates values for one or more switching parameters for a switching device of the power inverter, a predicted value for the on-state current $I_{ds}$ of the switching device. The one or more switching parameters can be selected from a first set of switching parameters. In embodiments, the predicted value for the on-state current $I_{ds}$ can be based on the values of the one or more switching parameters for the switching device. In embodiments, the method includes determining a first residual that includes the difference between the predicted value for the another switching parameter of the switching device and an actual value of the predicted value for the another switching parameter. In embodiments, the method includes generating a first test statistic based on the first residual. In some embodiments, the method includes generating an anomaly signal based on the predicted value. The anomaly signal can be related to the presence of a fault in the switching device.

In various embodiments, the first set of switching parameters includes body-diode voltage $V_{bd}$, voltage between drain and source $V_{ds}$, and squared voltage between gate and source $V^2_{gs}$.

In embodiments, the first set of switching parameters can include body-diode voltage $V_{bd}$, voltage between drain and source $V_{ds}$, voltage between gate and source $V_{gs}$, $V_{gs}*V_{ds}$, and squared voltage between gate and source $V^2_{gs}$.

In embodiments, the method includes evaluating the mean square error (MSE) of models based on different subsets of switching parameters from the first set of switching parameters. In embodiments, the method includes selecting an optimal feature set of i features, where i is less than the number of features in the first set of switching parameters, that yields a MSE that is closest in value to the MSE for a subset comprising the first set of switching parameters.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

9

10

Figure 4A:
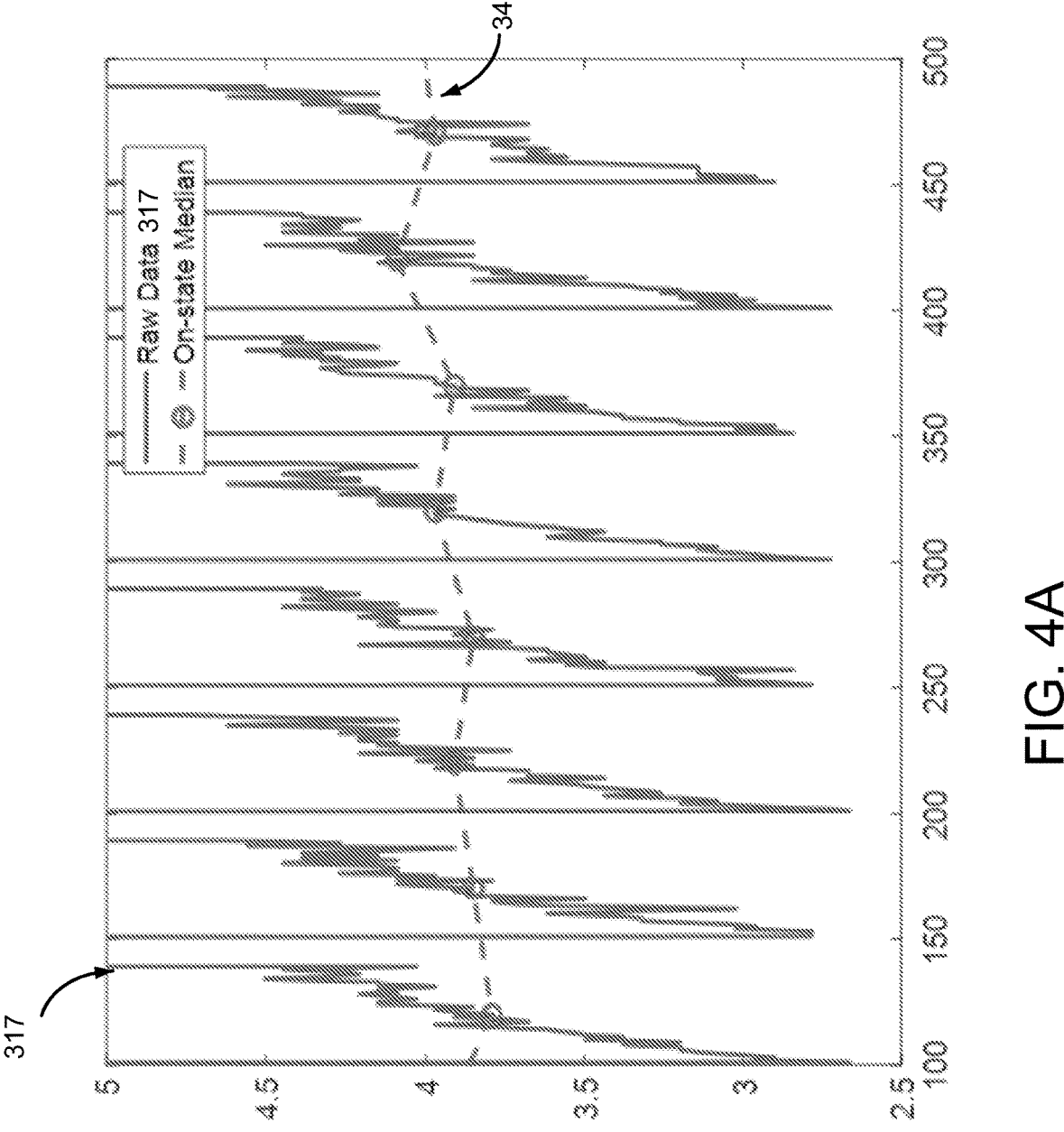
FIG. 4A depicts example data corresponding to switching parameters (the drain-source voltage Vim) of switching devices for power electronics as processed by preprocessing computer modules according to aspects of the present disclosure.
Figure 4B:
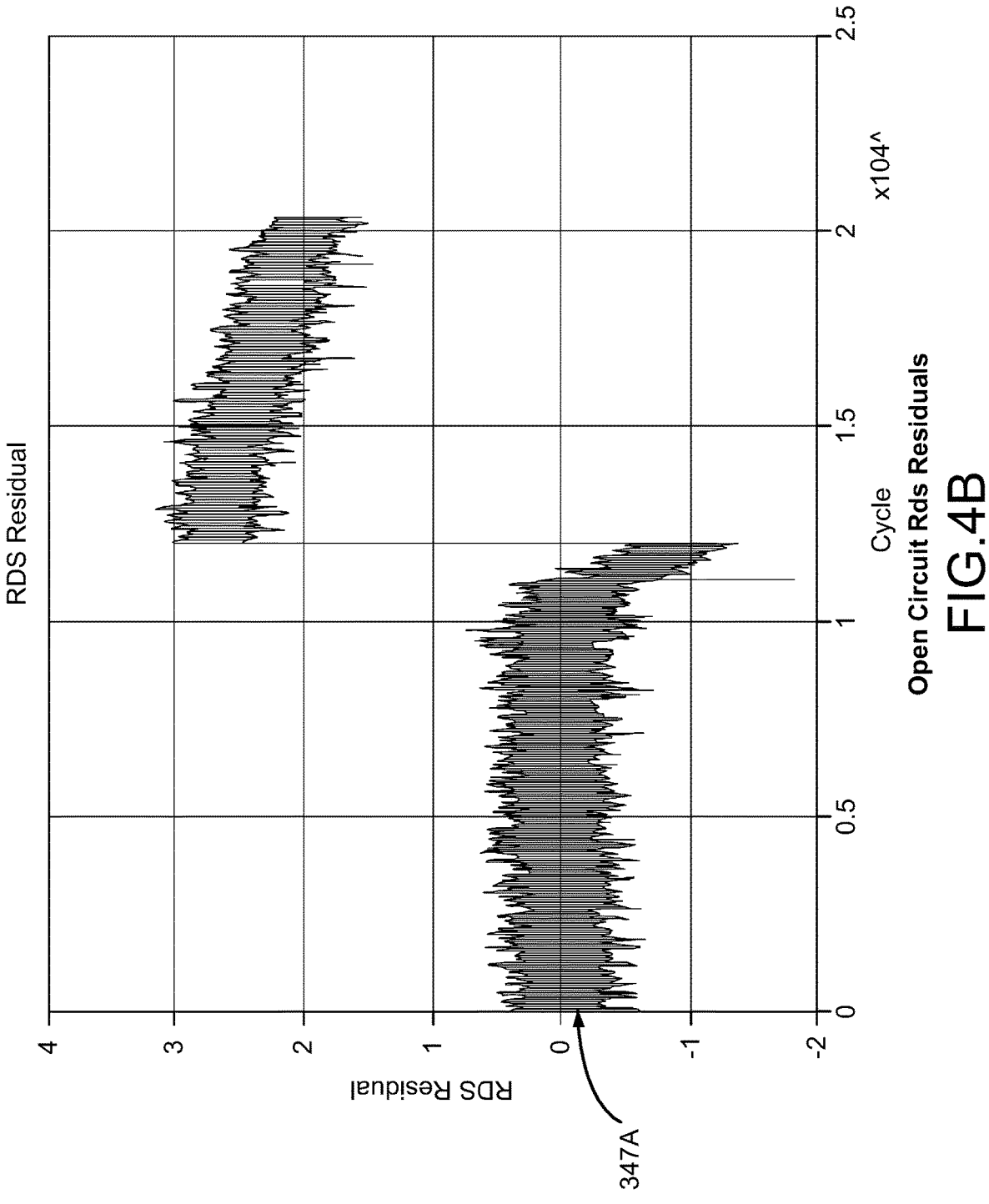
FIG. 4B depicts example residuals generated for predicted switching parameters (the drain source resistance $R_{Ds}$) of switching devices of power electronics according to aspects of the present disclosure.
Figure 4C:
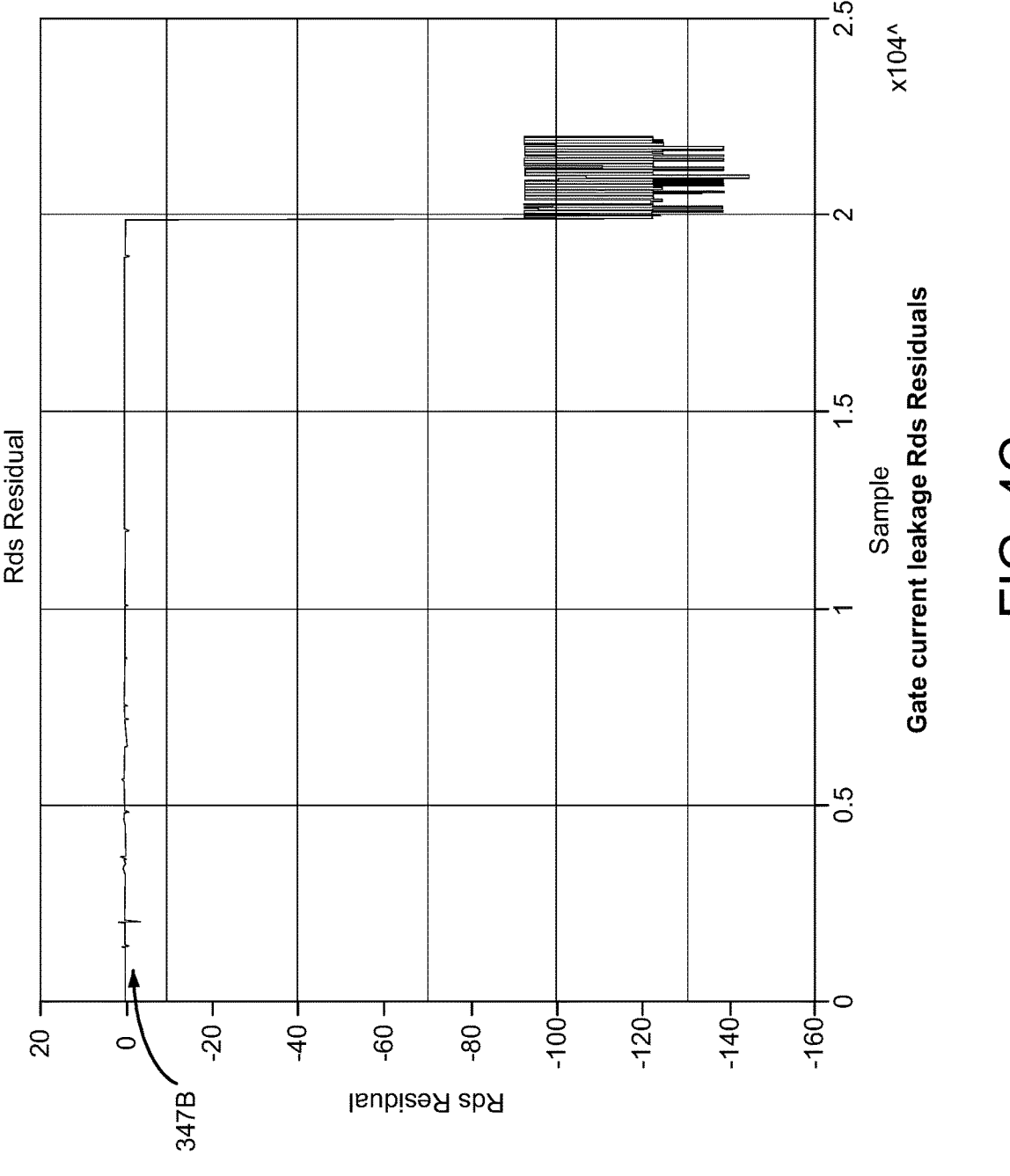
FIG. 4C depicts another example of residuals generated for predicted switching parameters (the drain source resistance $R_{Ds}$) of switching devices for power electronics according to aspects of the present disclosure.
Figures 4D, 4E:
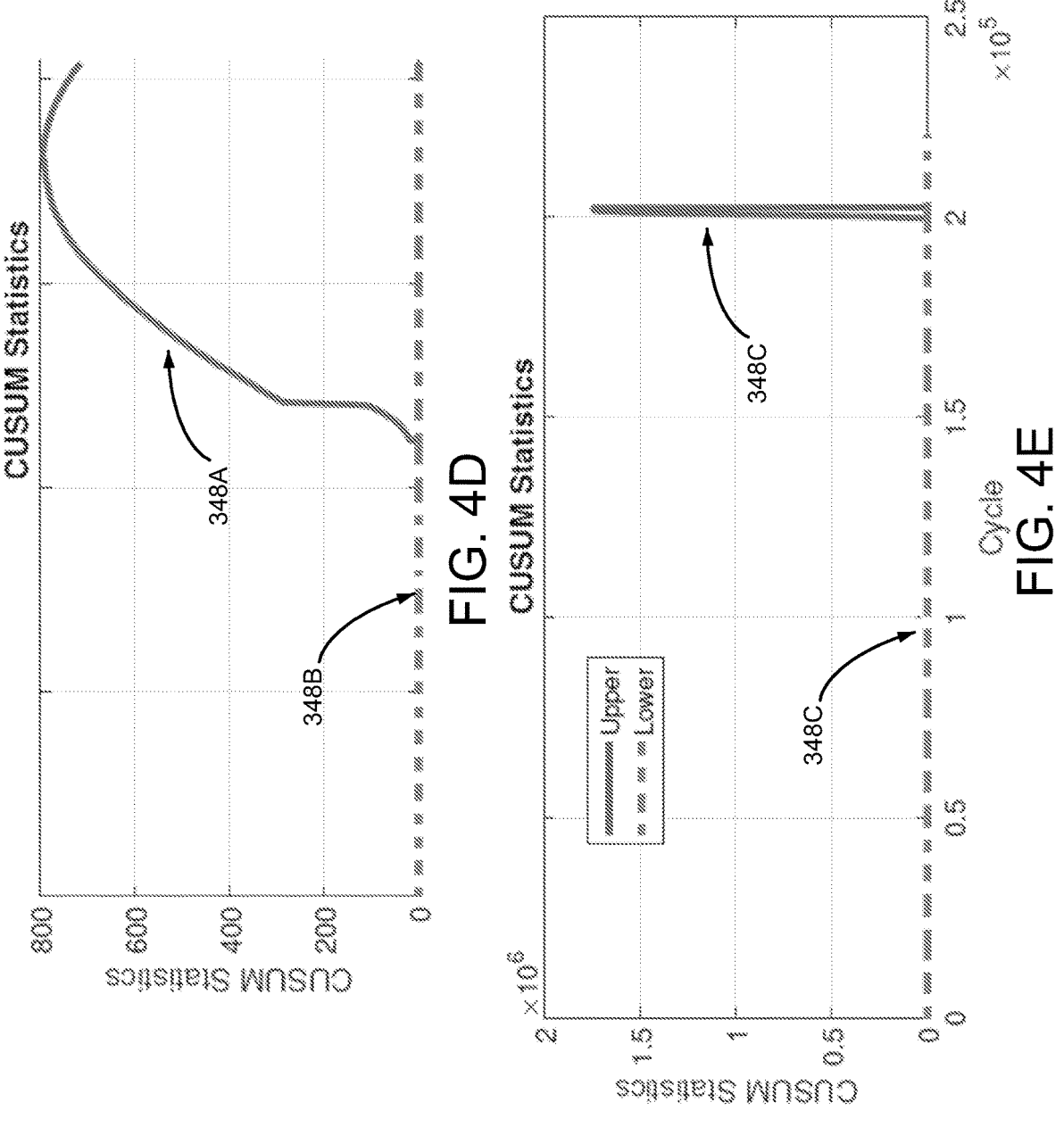
FIG. 4D depicts example test statistics generated from the residuals shown in FIG. 4B for a predicted switching parameter of switching devices of power electronics, where the test statics are associated with predicting and detecting failures of power electronic devices in accordance with example embodiments.
FIG. 4E depicts another example test statistics generated from residuals shown in FIG. 4C for switching parameters switching devices of power electronics, where the test statics are associated with predicting and detecting failures of power electronic devices in accordance with example embodiments.
Figure 4F:
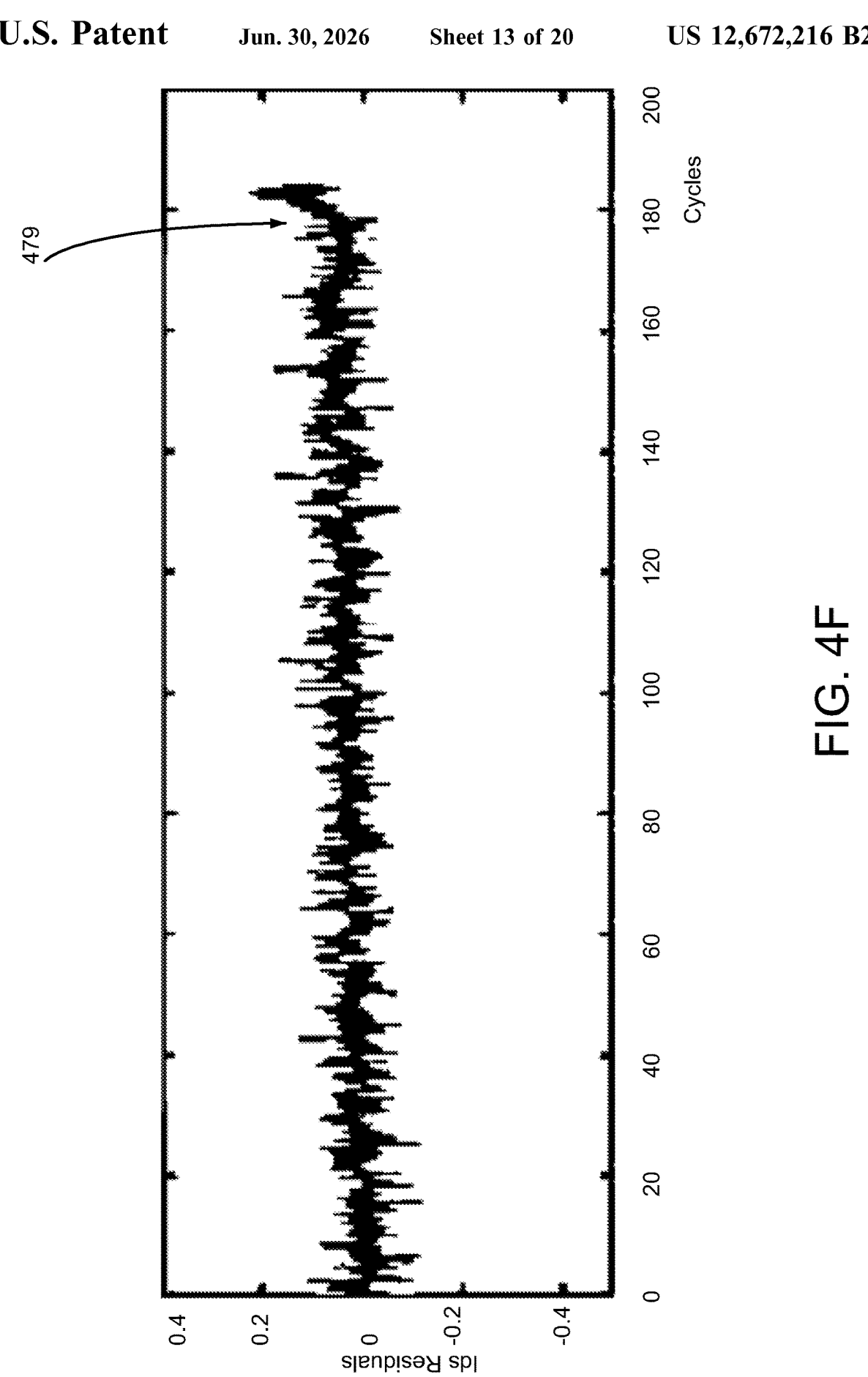
FIG. 4F shows a graph of example residuals generated for predicted switching parameters (the drain source current $I_{Ds}$) of switching devices for power electronics according to aspects of the present disclosure.
Figure 4G:
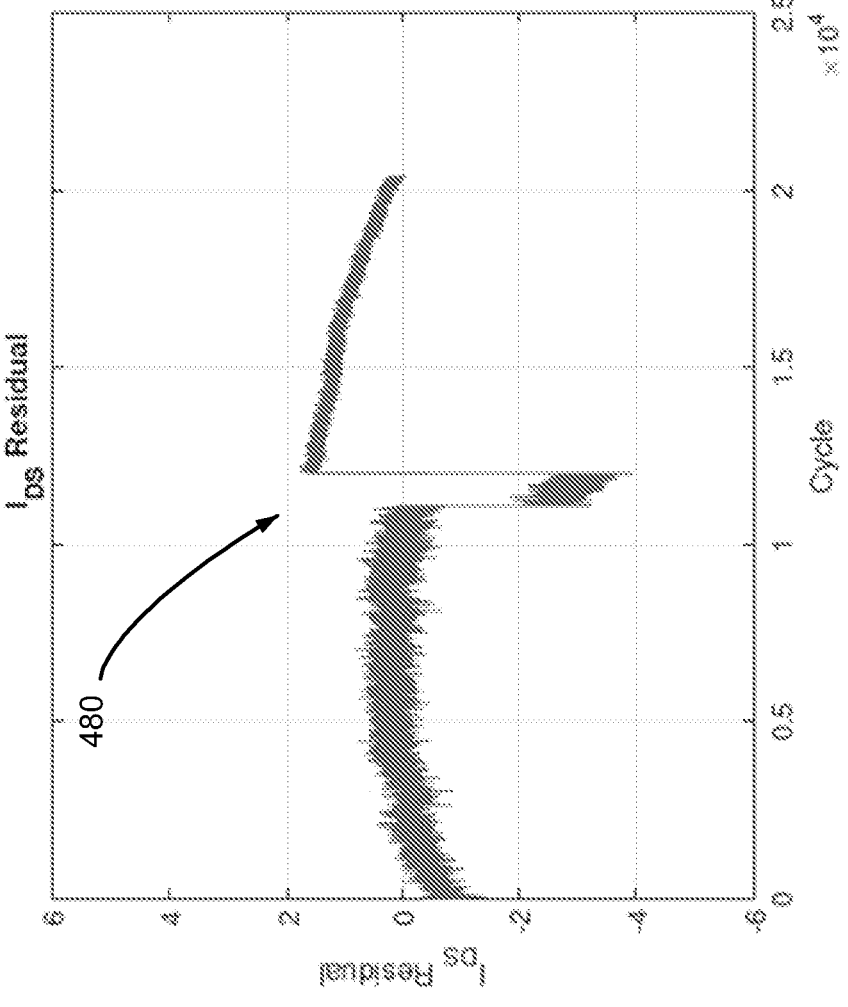
FIG. 4G shows another graph of example residuals generated for predicted switching parameters (the drain source current $I_{Ds}$) of switching devices for power electronics according to aspects of the present disclosure.
Figure 4H:
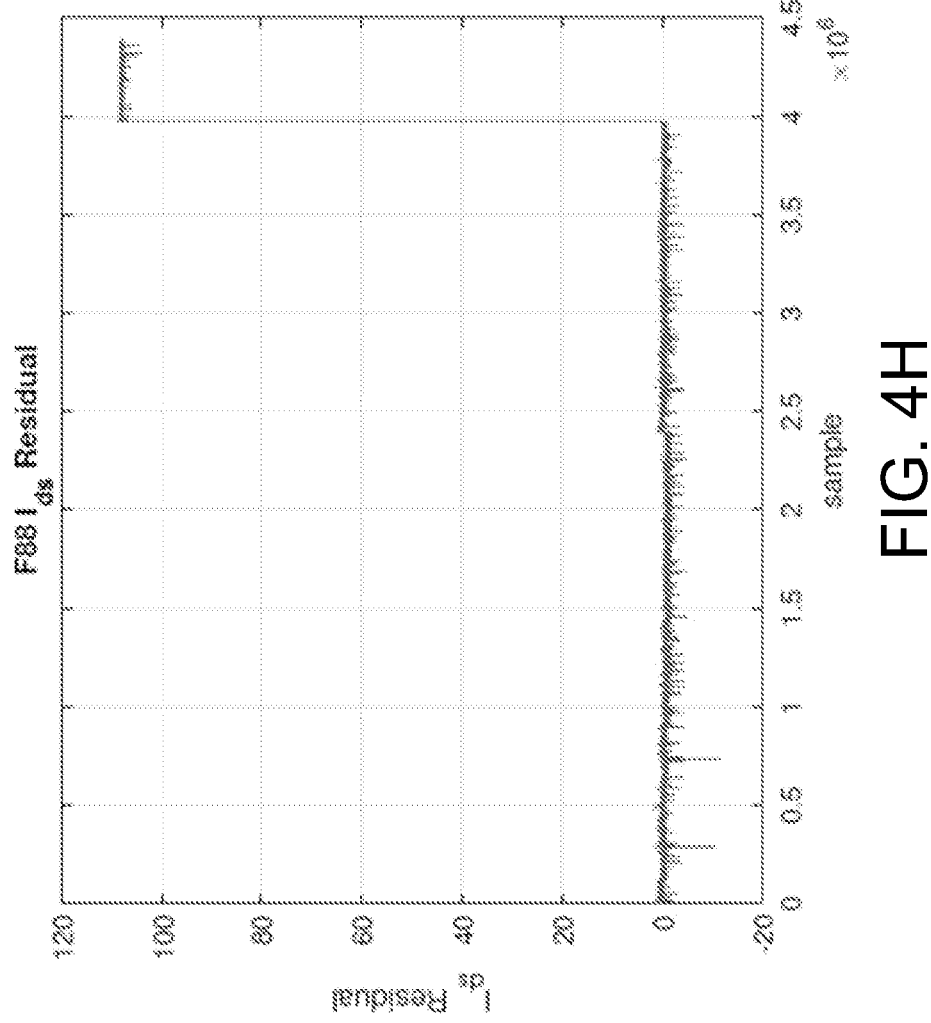
FIG. 4H shows another graph of example residuals generated for predicted switching parameters (the drain source current $I_{Ds}$) of switching devices for power electronics according to aspects of the present disclosure.
Figure 4I:
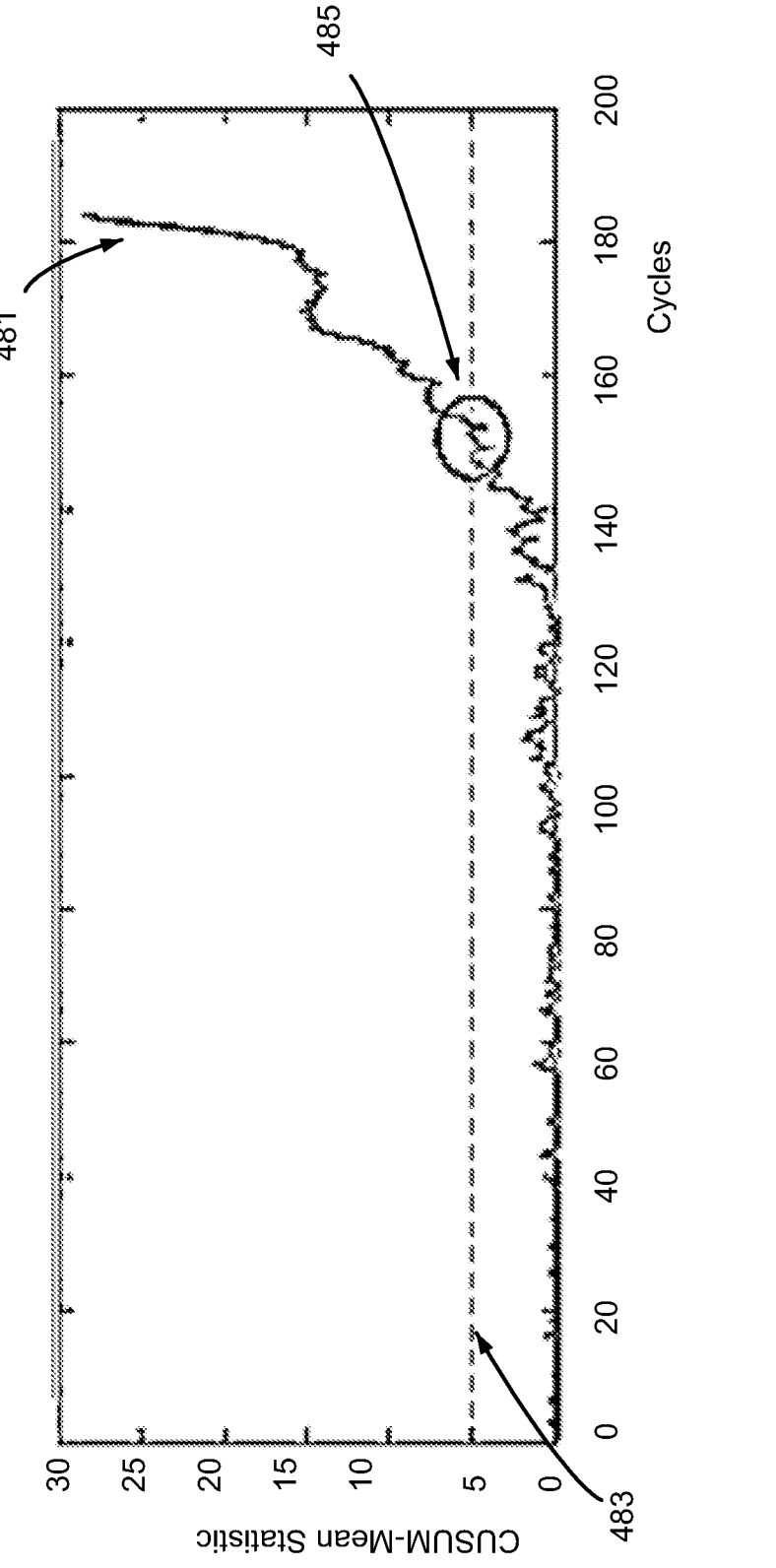
FIG. 4I shows a graph of example CUSUM-mean statistics generated from the residuals shown in FIG. 4F for predicting faults in power electronics according to aspects of the present disclosure.
Figures 4J, 4K:
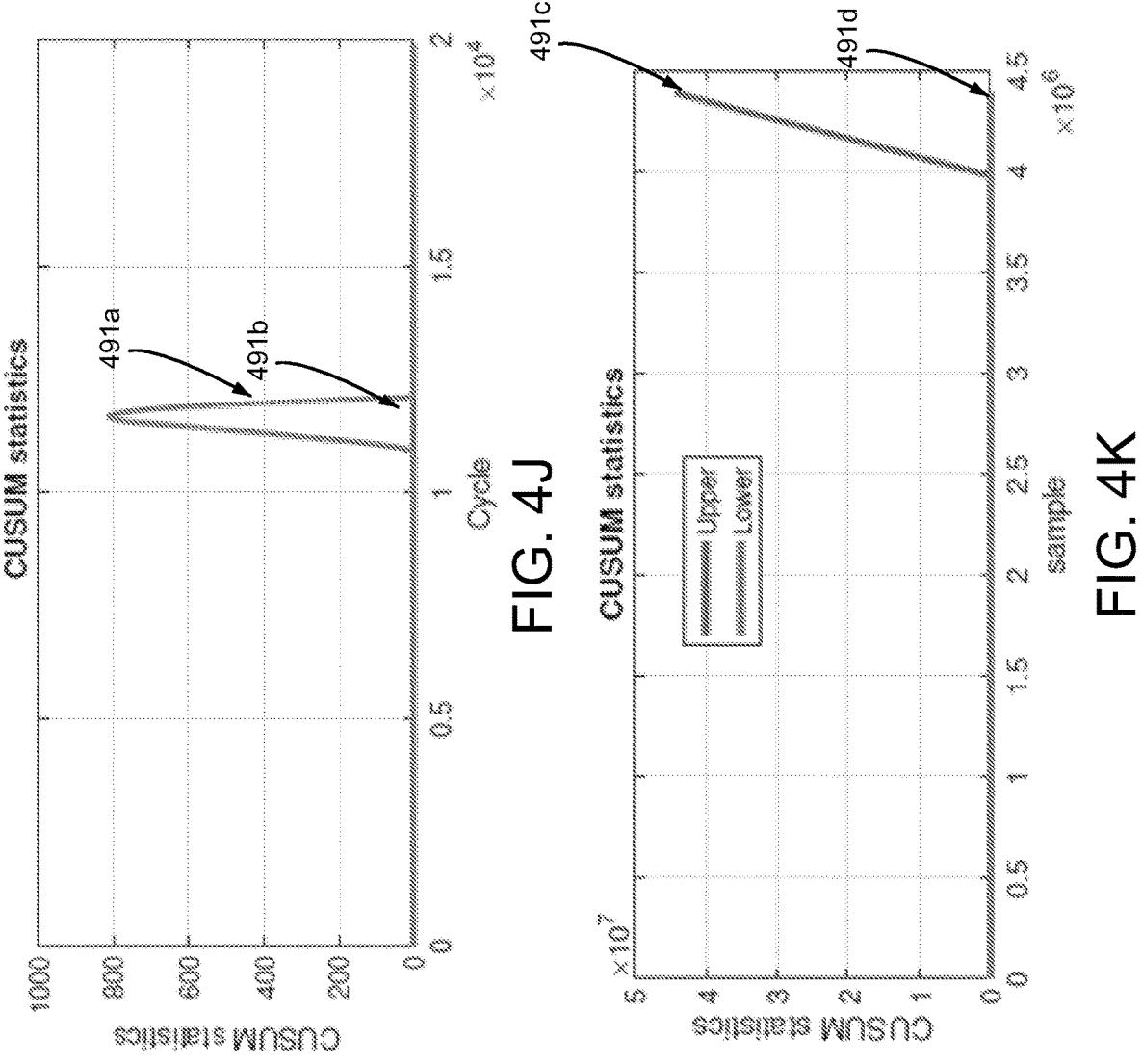
FIG. 4J shows another graph of example CUSUM-mean statistics generated from the residuals shown in FIG. 4G for predicting faults in power electronics according to aspects of the present disclosure.

FIG. 4K shows another graph of example CUSUM-Mean statistics generated from the residuals shown in FIG. 4H for predicting faults in power electronics according to aspects of the present disclosure.

Figure 5A:
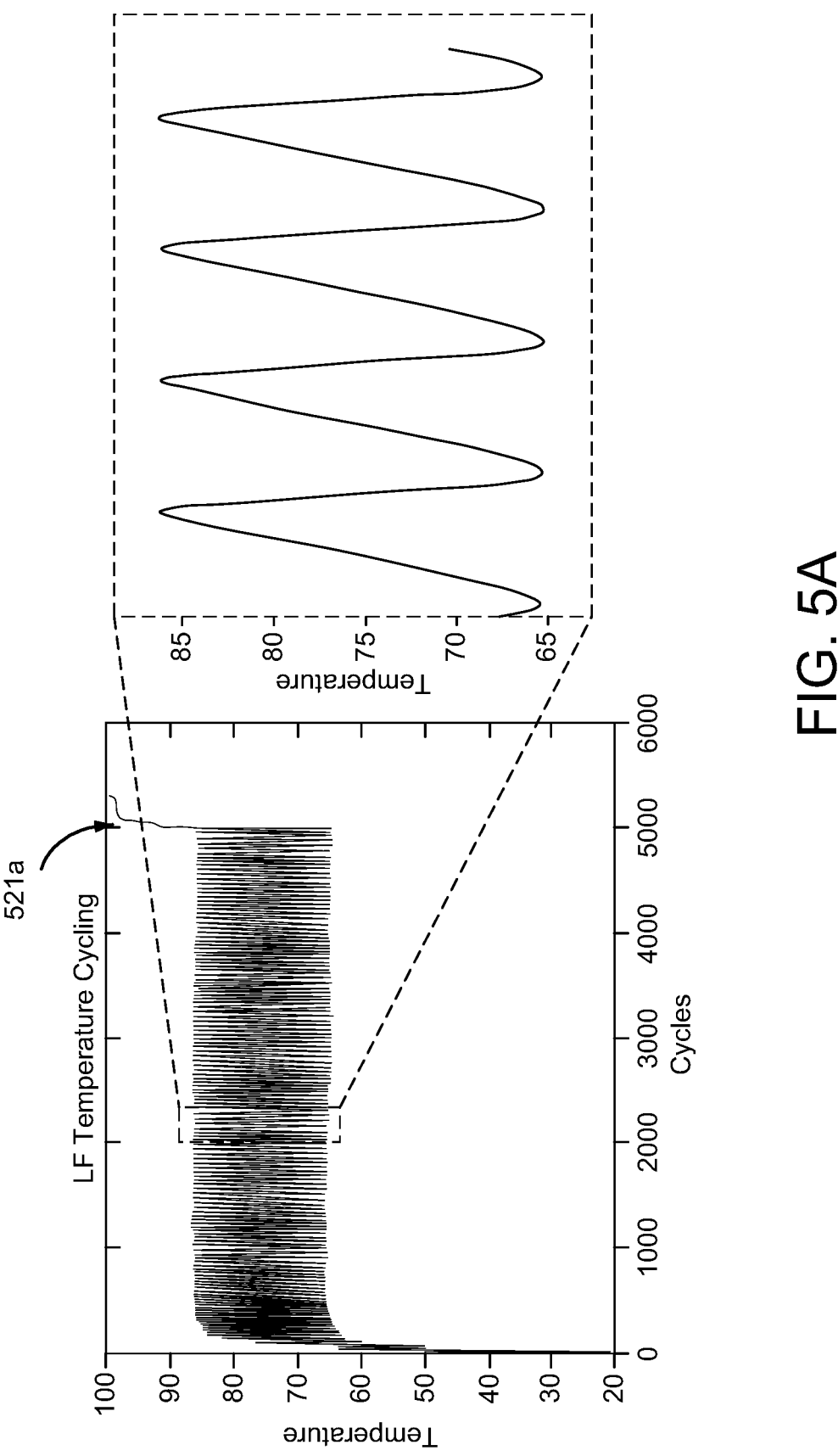

FIG. 5A shows a graph of low frequency switch cycling in switching devices for power electronics and the respective response in temperature, where the testing is associated with predicting and detecting failures of power electronic devices in accordance with example embodiments.

Figure 5B:
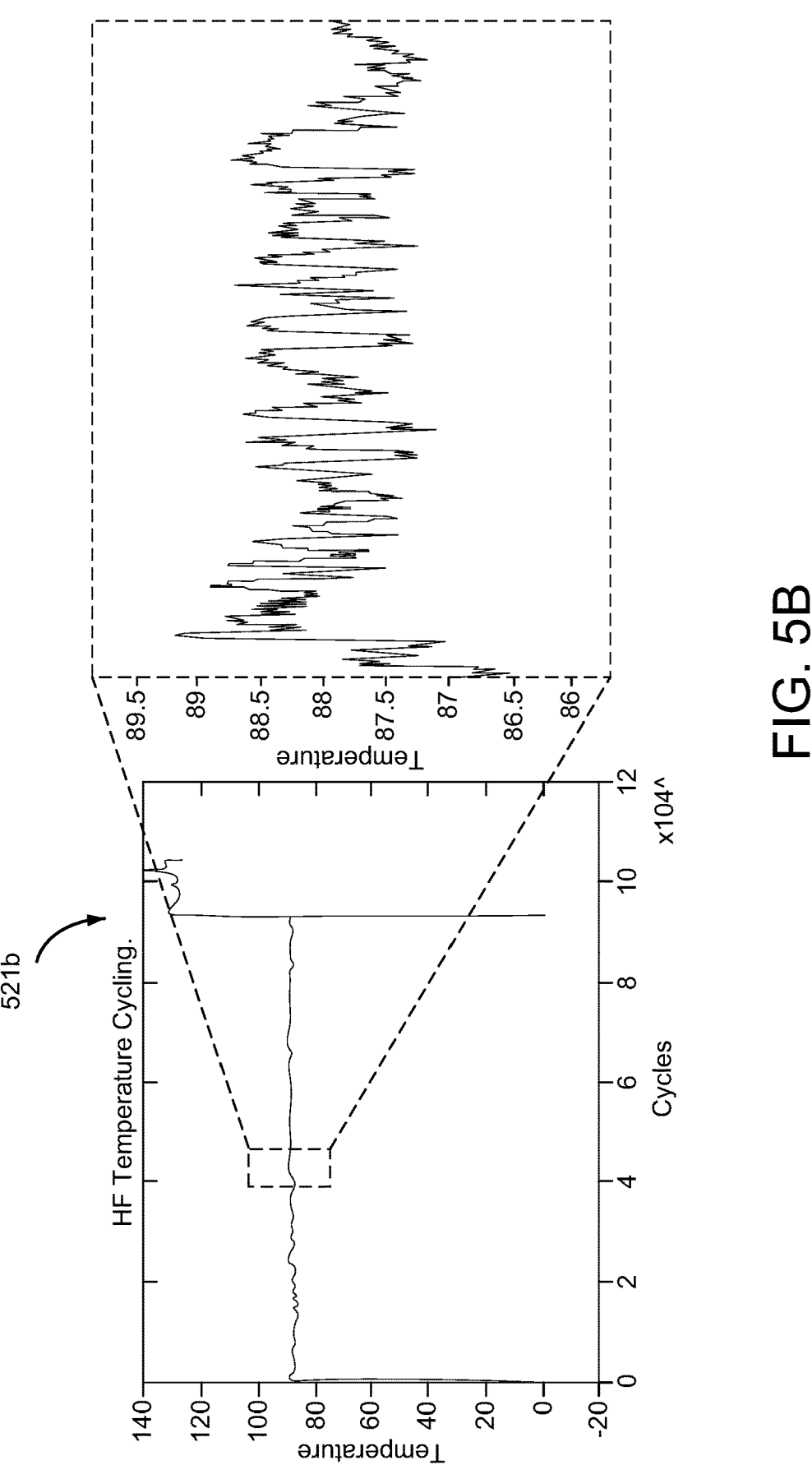

FIG. 5B shows another graph of high frequency switch cycling in switching devices for power electronics and the respective response in temperature, where the testing is associated with predicting and detecting failures of power electronic devices in accordance with example embodiments.

Figure 6:
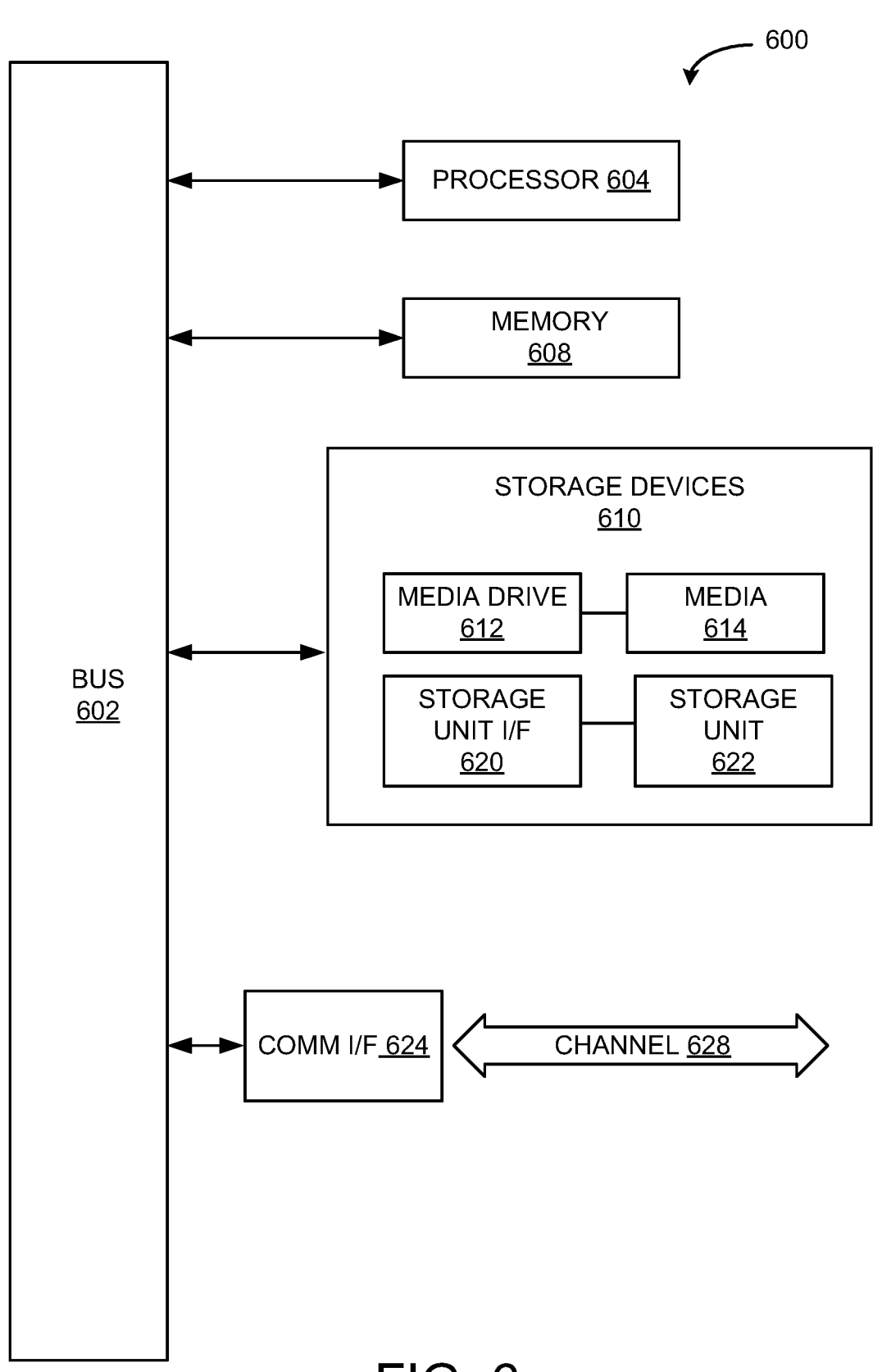

FIG. 6 is an example computing component that may be used to implement various features of embodiments of disclosed technology.

The figures are not exhaustive and do not limit the present disclosure to the precise form disclosed.

DETAILED DESCRIPTION

Example embodiments disclosed herein relate to, among other things, systems, methods, computer-readable media, techniques, and methodologies for detecting and predicting failure modes in power electronics. In particular, systems and methods described herein enable the discovery of non-linear relationships between measured and/or predicted parameters.

The techniques disclosed herein for detecting and predicting failure modes of power electronics provide technical solutions to a variety of technical problems associated with existing techniques. In particular, existing techniques may only capture linear relationships between measured parameters, as opposed to non-linear relationships. For example, Principle component analysis (PCA) may be used to project the data into orthogonal directions, thereby removing multi-collinearity in the data and reducing its dimensionality. In addition, some solutions utilize principal component analysis (PCA) to compute Q and $T^2$ statistics. Example systems include those outlined in U.S. application Ser. No. 16/361,780 published as U.S. Patent Pub. 20200301772 which was filed on Mar. 22, 2019 and which is incorporated by reference except for any definitions, disclaimers, disavowals, and inconsistencies. Some solutions may also utilize exponentially weighted moving averages filter(s) to track non-stationary exponentially weighted moving average (EWMA) and operating condition-dependent feature means to improve detection accuracy and minimize false alarms. Such systems are disclosed in U.S. application Ser. No. 16/743,541 filed on Jan. 15, 2020, which is incorporated herein by reference, except for any definitions, disclaimers, disavowals, and inconsistencies. In such systems, prior to removing the EWMA means, the mean may trend upwards which can lead to false positives. The present disclosure allows for continuously learning the underlying structure of the data by predicting present measurement values from past values. It is understood that all of these techniques may be utilized in conjunction with the present disclosure and the present disclosure improved upon such techniques, for example, to capture non-linear relationships between measured parameters. With embodiments of the present disclosure, residuals are generated abased on the prediction performance of the model. These residuals are further utilized to detect faults.

The present disclosure proposes two unsupervised data-driven approaches to learn the nominal model of a switching device and use the deviations between actual measurements and predictions ("residuals" or "deltas") as an input to a sequential quickest detection test, or cumulative sum control (CUSUM) test. Specifically, nonlinear auto-regressive exogenous (NARX) neural network and partial least squares (PLS)-based models are used as two complementary methods for predicting the signals of interest corresponding to switching device parameters during the on-state of a switching device (e.g., current, voltage, on-state resistance, body diode voltage or case temperature), assuming nominal operation.

The NARX model uses delays to model the dependence of the current on-state median) output on the current and previous values of the exogenous inputs (e.g. on-state median values for switching parameters) and previous values of the output. For example, the NARX model can use X and Y, where X=[gate source voltage Vgs] and Y=[drain-source voltage Vds, drain current Ids, case temperature T, drain-source resistance Rds]. X(t) and Y(t−1) can be used as inputs to predict ŷ(t) or Y(t).

Informed by physics-based models, optimal and sub-optimal feature selection methods using dynamic programming are used to select the most informative signals and their transformations as inputs to the PLS model. PLS may allow more robustly addressing any correlation between switching device parameters. Dynamic programming is used to identify predictive switching parameters, such as body-diode voltage Vbd, voltage between drain and source Vds, and squared voltage between gate and source $V^2$gs in a data set of power electronic device switching parameters. Partial least squares regression is performed on those informative signals, such as a body-diode voltage ($V_{bd}$), voltage between drain and source ($V_{ds}$), and squared voltage between gate and source ($V^2_{gs}$). On-state current of a power electronic device may be predicted using the partial least squares regression.

The NARX model uses on-state medians of signals in each switching cycle as inputs and outputs, while the PLS model works with filtered on-state samples directly. Embodiments detect a fault in a power electronic device using a cumulative sum (CUSUM) on residuals computed as a difference between a mean predicted current, and the mean true current of the power electronic device.

The learned models of power MOSFET devices are applicable at both low-frequency and high-frequency switching and under various operating conditions. The predictions from the NARX and PLS models are used to compute the residuals.

The CUSUM test can detect even slight deviations accurately. The CUSUM test monitors the changes in mean or variance of these residuals to detect anomalies. It is also understood that the range, mean, standard deviation, skewness, kurtosis, entropy, and centroid can be used. When cumulative sum control (CUSUM) test and/or CUSUM-mean is utilized, the test can be more sensitive than T^2 and Q statistics.

The data preprocessing steps used in the proposed anomaly detection methods sup-press the impact of instrument noise via median filtering (for NARX) and a moving average (a form of (a form of finite impulse response) digital filter (for PLS), and increase the statistical power of anomaly detectors via extreme data removal. The proposed methods could be implemented both online (i.e. on a vehicle) and offline.

Example embodiments provide technical solutions to the above-described technical problems associated with existing fault detection systems. Various technical features and aspects of embodiments of disclosed technology that yield the above-described technical solutions and their resulting technical benefits will now be described in more detail in reference to the Figures and the illustrative embodiments depicted therein.

Figure 1:
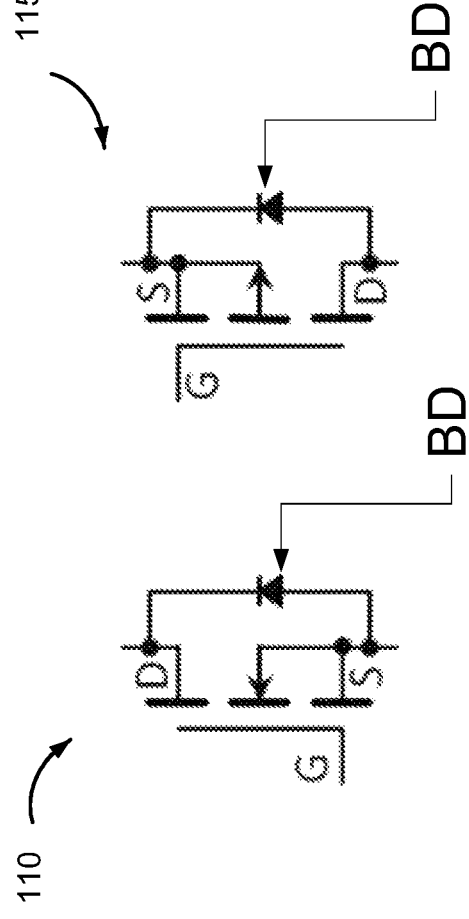
FIG. 1 shows a schematic representation of example switching devices in accordance with example embodiments.

FIG. 1 is a circuit schematic representation of example switching devices which can be used as part of power electronics, such as rectifiers and/or inverters, in accordance with aspects of the present disclosure. FIG. 1 shows example power metal oxide semiconductor field-effect transistors (MOSFETs), including N-channel enhancement-mode power MOSFETs 110 and P-channel enhancement-mode power MOSFETs 115. MOSFETs may include gate (G), body (not labelled), source (S) and drain (D) terminals.

As shown in FIG. 1, a parasitic bipolar junction transistor (BJT) may be formed as an integral part of the MOSFET. The body region may serve as the base of the BJT, the source as the emitter, and the drain D as the collector. As shown in FIG. 1, an intrinsic body diode BD may be formed between the drain D and source S of the MOSFET. The body diode BD is formed in the body-drain p-n junction.

a threshold, and saturation when there is a constant current IDS independently of voltage, VDS.

As such, for example, the switching parameters can include on-state values for the switching parameters, whereby the on-state values are values for the parameters as detected when and/or if the switching device is in the on-state and/or when the gate G is biased on. As such, VGS can be a toggled or controlled value and may be known. The MOSFET can exhibit resistive behavior in the on-state, as such the drain-source resistance RDS can correspond to on-state resistance RDS(ON). RDS(ON) is an important indicator of bond wire hit-off, heel cracking, and fractures. Thus, RDS(ON) can be calculated from IDS and VDS.

The voltage between the gate G and source S, gate-source voltage VGS, controls the flow of drain-source current IDS, the current between the drain D and the source S. As VDS is increased, the drain current IDS increases, but due to the applied voltage VGS, the drain current is controlled at a certain level (saturation).

The relationship between switching parameters in MOSFETs measurements can be described by a nonlinear function. For example, For example, drain-source current IDS is related with drain-source voltage VDS and the gate-source current VDS can be described as:

$$I_{DS=}$$

$$\begin{cases} KF_x KP_x \dfrac{(V_{GS}-VT_x)V_{DS} - LINSAT^{kx-1}(V_{GS}-VT_x)^{\frac{2-kw}{kx}}}{1 + THETA_x(V_{GS}-VT_x))}, & \text{if } V_{DS} < \dfrac{V_{GS}-VT_x}{LINSAT} \\[1.5em] KP_x \dfrac{(V_{GS}-VT_x)^2}{2(1 + THETA_x(V_GS - VT_x))}, & \text{if } V_{DS} < \dfrac{V_{GS}-VT_x}{LINSAT} \end{cases}$$

$$kx = \dfrac{KF_x}{KF_x - \dfrac{LINSAT}{2}}$$

Although MOSFETs are shown, it is understood that the present disclosed technology applies to other switching devices, such as Power Bipolar Junction Transistors (BJTs) and Insulated Gate Bipolar Transistors (IGBTs). It is also understood that systems and methods described in the present disclosure apply to a variety of materials and chemistries for switching devices, including a variety of metals (e.g. for the gate G), insulating layers (e.g. to insulate the gate), and semiconductors such as silicon, gallium arsenide, gallium nitride, etc.

Switching devices as described herein can have one or more switching device parameters (or switching parameters as used herein) which define one or more characteristics of the switching device. Example switching parameters can include drain-source current IDS (or drain current IDS), drain-source voltage VDS, gate-source voltage VGS, and drain-source resistance RDS. VDS can be a surrogate for device temperature and/or breakdown voltage or body diode voltage VBD.

It can also be understood that switching devices can have different states states between these states. The voltage between gate G and source S, VGS, controls the flow of current, IDS, between the drain and the source. As VDS is increased, the drain current IDS increases, but due to the applied gate source voltage VGS, the drain current is controlled at a certain level (e.g. saturation level). MOSFET devices operate in three modes: ON when there is adequate VGS to allow the current to pass, OFF when VGS is below In the above equations, $KF_x$, $KP_x$, respectively, the high and low current gain factor, LINSAT is the linear to saturation transition parameter, THETA is the transverse field mobility parameter, and $VT_x$ is the threshold voltage, which is related to the temperature T. Based on this physics-based model, $I_{DS}$ can be modelled as $$I_{DS} = a_0 + a_1 V_{GS} V_{DS} + a_2 V_{GS} + a_3 V_{GS}^2 + a_4 V_{DS} + a_5 T.$$

MOSFET devices operate in three modes: ON when there is adequate VGS to allow the current to pass, OFF when VGS is below a threshold, and saturation when there is a constant current in IDS independently of voltage, VDS.

Failure modes in MOSFET devices can include two distinct categories: extrinsic failures and intrinsic failures. Extrinsic failures relate to packaging and/or assembly, such as metallization reconstruction, wire-bonding, and solder joint fatigue. Large package areas and non-homogeneously sourced materials may make the devices vulnerable to thermal stress. Mismatches in thermal expansion coefficients in packaging manifest as wire bond and solder joint failures. Intrinsic failures relate to device physics for the switching devices, including dielectric breakdown, hot carrier injection, electromigration, and corrosion. Intrinsic failures can be caused by power cycling through the semiconductor dies rather than the packaging itself.

Faults and failures are also classified based on their electrical behavior, namely open and short-circuit failures.

Classification of open and short-circuit failures can be performed using electrical tests, but device decapsulation and/or imaging (e.g. X-ray) can provide root causes for each fault type and the location within a device.

Typically, one measures sampled time histories of VGS, VDS, IDS and body diode voltage VBD; the latter serves as a surrogate for the case temperature, TC and/or heat sink temperature of the device. VDS, VGS, IDS, and Rds as disclosed herein can be inputs to one or more components of the systems and methods described herein for predicting failure more of the switching devices.

As previously alluded to, PE devices can be used in EVs. PE devices can control the speed and torque of the motor. They can also convert and distribute electrical power to other vehicle systems, such as heating and ventilation, lighting, and infotainment. As such, before discussing details of the present disclosure, it may be beneficial to discuss example implementations of fault detection circuitry for PE devices and example context that the present disclosure may be embodied.

Figure 2:
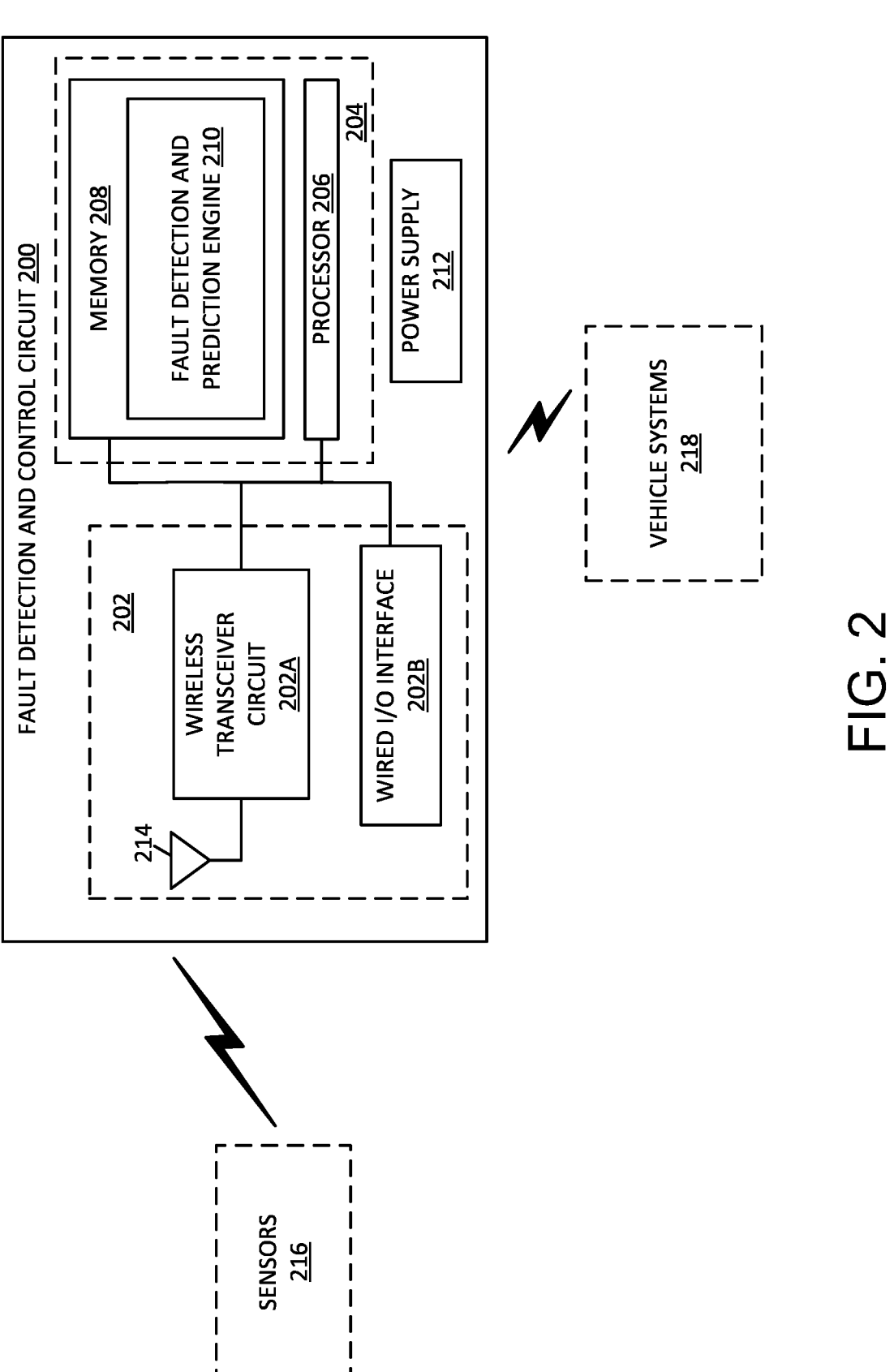
FIG. 2 illustrates an example circuit architecture for detecting the health status of power electronic devices in accordance with example embodiments.

Referring first to FIG. 2, an example implementation of a fault detection and control circuit 200 is depicted. Fault detection and control circuit 200 may be configured to implement one or more methods and fault detection, diagnosis and prognosis (FDDP) techniques as disclosed herein. The control circuit 200 may, for example, be configured to execute machine-executable instructions contained in fault detection and prediction engine 210 to FDDP as disclosed herein. The control circuit 200 may be provided in a vehicle, such as electric or hybrid vehicle. For instance, control circuit 200 can be implemented as part of an electronic control unit (ECU) of a vehicle or as a standalone component. The example control circuit 200 may be implemented in connection with any of a number of different vehicles and vehicle types including, without limitation, automobiles, trucks, motorcycles, recreational vehicles, or other on- or off-road vehicles. In addition, example embodiments may be implemented in connection with hybrid electric vehicles, gasoline-powered vehicles, diesel-powered vehicles, fuel-cell vehicles, electric vehicles, or the like. It is also understood that the control circuit 200 can be implemented in off-vehicle systems, such as ground support equipment, such as charging (wired or wireless) equipment.

In the example implementation depicted in FIG. 2, the control circuit 200 includes a communication circuit 202, a decision circuit 204 (including a processor 206 and a memory 208 in this example) and a power supply 212. While components of the control circuit 200 are illustrated as communicating with each other via a data bus, other communication interfaces are also contemplated. Although not depicted in FIG. 2, the control circuit 200 may include a switch (physical or virtual) that allows a user to toggle the functionality of the control circuit 200 disclosed herein on and off.

Processor 206 can include a graphical processing unit (GPU), a central processing unit (CPU), a microprocessor, or any other suitable processing unit or system. The memory 208 may include one or more various forms of memory or data storage (e.g., flash memory, random access memory (RAM), etc.). Memory 208, can be made up of one or more modules of one or more different types of memory, and may be configured to store data and other information as well as operational instructions that may be used by the processor 206 to implement functionality of the control circuit 200. For example, the memory 208 may store a fault detection and prediction engine 210, which may include computer-executable/machine-executable instructions that, responsive to execution by the processor 206, cause various processing to be performed in connection with detecting one or more faults of PE as described herein. The executable instructions of the engine 210 may be modularized into various computing modules, each of which may be configured to perform a specialized set of tasks associated with detecting one or more faults of PE, such as open circuit, short circuit, gate current leakage, and/or over temperature conditions.

Although the example of FIG. 2 is illustrated using processor and memory circuitry, as described below with reference to circuits disclosed herein, decision circuit 204 can be implemented utilizing any form of circuitry including, for example, hardware, software, firmware, or any combination thereof. By way of further example, one or more processors; controllers; application specific integrated circuits (ASICs); programmable logic array (PLAs) devices; programmable array logic (PAL) devices; complex programmable logic devices (CPLDs); field programmable gate arrays (FPGAs); logical components; software routines; or other mechanisms might be implemented to make up the control circuit 200. Similarly, in some example embodiments, the engine 210 can be implemented in any combination of software, hardware, or firmware.

Communication circuit 202 may include a wireless transceiver circuit 202A with an associated antenna 212 and/or a wired input/output (I/O) interface 202B with an associated hardwired data port (not illustrated). As this example illustrates, communications with the control circuit 200 can include wired and/or wireless communications. Wireless transceiver circuit 202A can include a transmitter and a receiver (not shown) to allow wireless communications via any of a number of communication protocols such as, for example, an 802.11 wireless communication protocol (e.g., WiFi), Bluetooth, near field communications (NFC), Zigbee, or any of a number of other wireless communication protocols whether standardized, proprietary, open, point-to-point, networked or otherwise. Antenna 212 is coupled to wireless transceiver circuit 202A and is used by wireless transceiver circuit 202A to transmit radio frequency (RF) signals wirelessly to wireless equipment with which it is connected and to receive radio signals as well. These RF signals can include information of almost any sort that is sent or received by the control circuit 200 to/from other entities. For example, in the context of a vehicle, such entities can include vehicle sensors 216, other vehicle systems 218, or the like.

A vehicle, such as an electric vehicle, can include a plurality of sensors 216 that can be used to detect various conditions internal or external to the vehicle and provide sensed conditions to, for example, the control circuit 200. For example, sensors 216 can be configured to detect various conditions related to one or more vehicle systems 218. In example embodiments, the sensors 216 may be configured to detect one or more conditions directly or indirectly such as, for example, temperature, fuel efficiency, tire pressure, motor efficiency, hybrid efficiency, acceleration, battery health, charging efficiency, mechanical stress or wear (e.g. by strain gauge), etc. In embodiments, sensors 216 may include a sensor network configured to detect one or more of the switching parameters described herein, such as drain current IDS, drain-source voltage VDS, gate-source voltage VGS, drain-source resistance Rds, and/or temperature TD of one or more switching devices. In some embodiments, one or more of the sensors 216 may include their own processing capability to compute the results for additional information that can be provided to, for example, an ECU and/or the control circuit 200. In other example embodiments, one or more sensors may be data-gathering-only sensors that provide only raw data. In further example embodiments, hybrid sensors may be included that provide a combination of raw data and processed data. The sensors 216 may provide an analog output or a digital output.

One or more of the sensors 216 may be able to detect conditions that are external to the vehicle as well. Sensors that might be used to detect external conditions can include, for example, sonar, radar, lidar or other vehicle proximity sensors, and cameras or other image sensors. Image sensors can be used to detect, for example, objects associated with a signalized intersection. While some sensors can be used to actively detect passive environmental objects, other sensors can be included and used to detect active objects such as those objects used to implement smart roadways that may actively transmit and/or receive data or other information.

Referring again to the control circuit 200, wired I/O interface 202B can include a transmitter and a receiver (not shown) for hardwired communications with other devices. For example, wired I/O interface 202B can provide a hardwired interface to other components, including vehicle sensors or other vehicle systems. Wired I/O interface 202B can communicate with other devices using Ethernet or any of a number of other wired communication protocols whether standardized, proprietary, open, point-to-point, networked or otherwise.

Power supply 212 can include one or more batteries of one or more types including, without limitation, Li-ion, Li-Polymer, NiMH, NiCd, NiZn, NiH2, etc. (whether rechargeable or primary batteries); a power connector (e.g., to connect to vehicle supplied power); an energy harvester (e.g., solar cells, a piezoelectric system, SAE J2954 wireless, etc.); or any other suitable power supply.

In example implementations, the fault detection and prediction engine 210 can generate one or more signals corresponding to detected and/or predicted oncoming faults of PE, such as of switching devices as described herein. The decision circuit 204 may be able to decide how the system (i.e. the vehicle) should react to that detected and/or oncoming fault. For example, the system may be able to send a message via communication circuit 202 that one or more parts of the vehicle should be serviced or replaced (and optionally schedule and/or arrange that service). In other example embodiments, fault detection and control circuit 200, i.e. by decision circuit 204, and/or by communication via communication circuit 202 to another vehicle system 218, may be able to decide on one or more mitigating actions. Mitigating actions may be performed in order to prevent and/or mitigate the on-set of the predicted fault. For example, one or more elements of the PE may be purposely shorted and/or opened (e.g. by way of one or more switches). As such, vehicle systems 218 may include one or more systems that may be configured to be responsive to and/or mitigate detected and/or predicted faults. For example, vehicle systems 218 can include active and/or passive thermal control systems which may be activated in response to the detected and/or predicted faults.

In example embodiments, the fault detection and control circuit 200 may be configured to double check or verify any signals generated by fault detection and prediction engine 210 that can correspond to detected and/or predicted oncoming faults of PE. For example, the fault detection and control circuit 200 may be able to request and/or receive information from one or more sensors 216 (such as imaging, thermal, or other sensors) that could be used to verify the information. In example embodiments, sensors 216 can be used to verify and/or update one or more models as described with reference to fault detection and prediction engine 210. For example, if the fault detection and prediction engine 210 does not detect a fault, but another sensor 216 does, one or more values used in the models of fault detection and prediction engine 210 described herein can be updated.

Although FIG. 2 is shown with reference to embodiments within a vehicle, such as vehicle sensors 216 and other vehicle systems 218, it is understood that the fault detection and control circuit 200 can be located off-vehicle. In some embodiments, the fault detection and control circuit 200 is configured to detect faults in PE in a laboratory setting, including in conjunction with testing and/or generation of training data. For example, sensors can also be located at or around the laboratory environment. In some embodiments, fault detection and control circuit 200 is executed in simulation environment (such as P-SPICE and/or other simulation software), wherein the PE and/or related sensors are also simulated. In some embodiments, fault detection and control circuit 200 is implemented in a testing setting in order to generate training data to be used and loaded onto implantations of fault detection and control circuit 200 on vehicles.

In some embodiments, fault detection and control circuitry related to fault detection and control circuit 200, and/or related PE are located and/or relate to one or more ground equipment, such as solar inverters, and/or vehicle charging equipment, such as rectifiers. It can also be understood that fault detection and control circuit 200 is not limited to applications with switching devices and/or PE. For example, the workflows, systems, and methods described herein are applicable to any type of sensed data (e.g. by sensors 216), and/or systems or subsystems (e.g. subsystem 218). Accordingly, aspects of the present disclosure may be useful for predicting and/or detecting faults of systems and/or devices that may exhibit nonlinear behavior and/or responses and complex and variety in respective failure mechanisms. It can also be understood aspects of the present disclosure may be useful for predicting and/or detecting faults of devices where multiple types of sensed data may be associated to predicting faults.

Referring now to FIGS. 3A-3D, in example embodiments, the fault detection and prediction engine 210 may include one or more computing modules, each of which may be configured to perform a specialized set of tasks as part of implementing functionality of the engine 210. It should be appreciated that the number of modules and the tasks associated with each module depicted in FIGS. 3A-3D are merely illustrative and not restrictive. The engine 210 may include more or fewer modules than what is depicted in FIGS. 3A-3D, and the partitioning as well as order of processing between the modules may vary. Although single modules may be shown, and/or single signals as inputs or outputs to the modules, it may be understood that the modules may be associate with multiple signals (e.g. as inputs and/or outputs) and may be associated to multiple workflows (e.g. performed in parallel). Each module may include module depicted as a sub-module of another module may instead be a standalone module, or vice versa. Moreover, each module may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execution of machine-executable instructions of the module and/or execution of hardwired logic of the module.

Figure 3A:
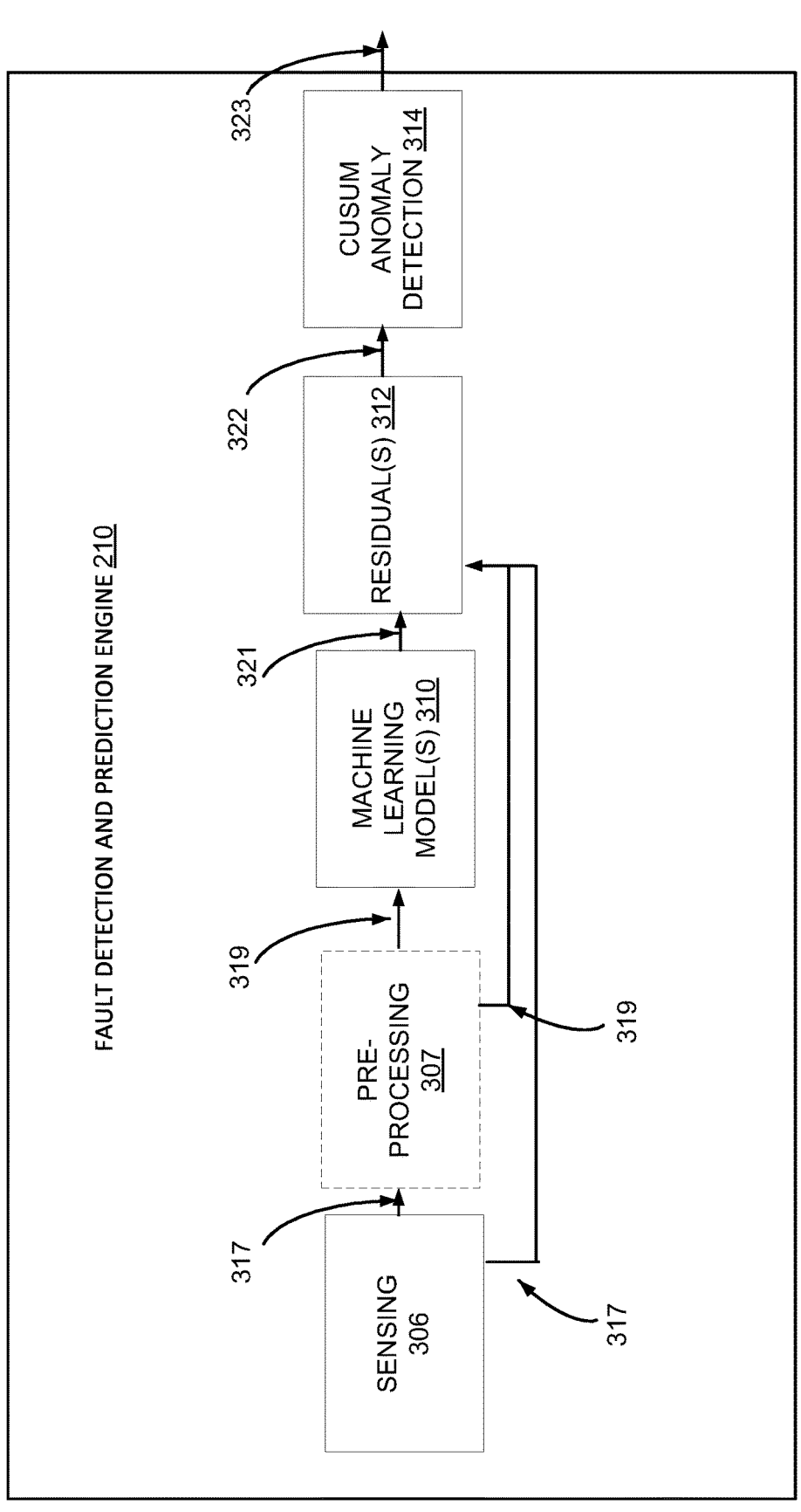
FIG. 3A illustrates example computing modules configured to perform various processing associated with predicting and detecting failures of power electronic devices in accordance with example embodiments.

In particular, as depicted in FIG. 3A, the engine 210 may include a sensing module 308, pre-processing module 307, a machine learning module 310, which can be a NARX and/or PLS modelling module, residual(s) module 312, and cumulative sum (CUSUM) anomaly detection module 314.

The sensing module 306 may be configured to receive one more values from sensors 216 and/or vehicle systems 318 shown with reference to FIG. 2. The values can correspond to samples taken from and/or by sensors, and/or information from memory, etc. The values can correspond to any changing and/or static information. The sensed data 317 can correspond to values for one or more of the switching parameters as described herein, including data in a time series. The sensed data can also include other information about the switching device which might be useful to fault detection and prediction engine 210, such as the switching devices intended or actual use, chemistry, or other characteristics. In example embodiments, the engine 210 is configured to receive raw signals VDS, VGS, IDS, Tc and/or VBD. These raw signals for sensed data 317 may be on-state signals for one or more switching devices as described herein.

The sensed data 317 from sensing module 306 can be processed by pre-processing module 307. Data preprocessing can include isolating signal components from noise, removing extreme measurements, down sampling, and/or adjusting scale differences among variables by auto-scaling to obtain normalized data. Pre-processing module 3017 can be configured to execute at least one data preprocessing methods. For example, these methods can include on-state median extraction to reduce the data size for training and deployment, and implementation of a digital filter to suppress noise. The on-state median extraction can be configured for use when a NARX model is applied at machine learning module 310. The on-state sampled data can be configured for use when a PLS-based model is applied at module 310. One or more filters can also be applied. The selection of the preprocessing method can be motivated by the model to be utilized by the NARX and/or PLS module. The selection of the preprocessing method can be motivated the observation that the on-state voltage, current and resistance have proved to be precursors indicating faults, such as wire-bond degradation.

In embodiments, the on-state raw signals corresponding to sensed data 317, such as VDS; VGS; IDS; TC or VBD can have inherent noise, which obscures the anomalies underlying the samples. In order to filter out the noise present in on-state signals, a moving-average filter (MAF) can be applied to the on-state data. The transfer function H(z) of a linear digital filter can be expressed in the Z-domain as:

$$Y(z) = \frac{\sum_{k=0}^{n_b} b_k z^{-k}}{1 + \sum_{k=1}^{n_a} a_k z^{-k}} X(z)$$

In the above equation, $n_a$ is the feedback filter order, $n_b$ is the feed-forward filter order. If the denominator is unity (no feedback), the above equation becomes a finite impulse response (FIR) filter. Assuming x(n) is the raw signal at sample point n and y(n) is the corresponding processed data sample after digital filtering, the general form of a FIR filtering operation is:

$$Y_n = \sum_{k=0}^{n_b} b_k x_n - k$$

A moving-average filter (MAF) may be a linear-phase low-pass FIR filter and may be used to smooth the sensed data 317. Moving-average filters are easy to implement and computationally effective. Assuming a MAF window length of $n_b$ ($n_b \in \mathbb{Z}^+$), the moving average filtering operation is:

$$Yn = \frac{1}{n_b} \sum_{k=0}^{n_b-1} x_n - k$$

Due to the large computational cost of neural network training (or the time sensitive requirements of vehicle driving) a median filter can be applied to reduce the data size of the samples corresponding to the sensed data 317 for NARX. Median filters are one example way to extract features from highly-noisy data with occasional extreme values. A non-recursive median filter is implemented by calculating median values of the samples in a given length window (e.g. on-state cycle length in our case).

One example median filter operation can be expressed as $y_n$=median(x(n–N), . . . x(n–1), x(n), x(n+1), . . . mx(n+N)), where x(n) and y(n) correspond to the input and output of a median filter at point n and the window length is 2N+1, and $N \in \mathbb{Z}^+$.

The down-sampling and filters described herein are merely non-limiting examples. It can be understood that other digital and/or analog filters can be applied.

To overcome the limitations of the linearized models, neural networks and machine learning models can be applied to the signals from switching devices. These can include NARX and/or PLS models executed at the machine learning module 310. These models can work directly with data and have the ability to learn and represent non-linear and complex relationships between the inputs and outputs. The pre-processing 307 may assist in dealing with noisy or corrupted data in manners specific to the model that is applied. Suitable data preprocessing and the use of regularization techniques in training may further facilitate the use of these models.

NARX and/or PLS models can be applied by the machine learning module 310 to processed data 319 (and/or to the sensed data 317) in order to generate one or more detected and/or predicted values. For example fault detection and prediction engine 210 can apply a NARX model and PLS model in parallel. For example, the two models can be used to generate predicted values for switching parameters, whereby the two predictions must be at or around the same value. In some embodiments, one model may be applicable to predicting a first subset of switching parameters and the other model may be applicable to predicting a second subset of switching parameters.

In some embodiments, the result of one model can be used to update the machine learning model used in the other. In example implementations, the results for the two models can be ORed. For example, if one or the other indicates a fault, the engine 210 can indicate that there is a fault. In other examples, if one or the other indicates a fault, the engine 210 can indicate that there is a fault to a first degree of certainty, but if the both results indicate faults, the fault detection and prediction engine 210 can indicate a fault to a higher degree of certainty than the first degree of certainty.

Figure 3B:
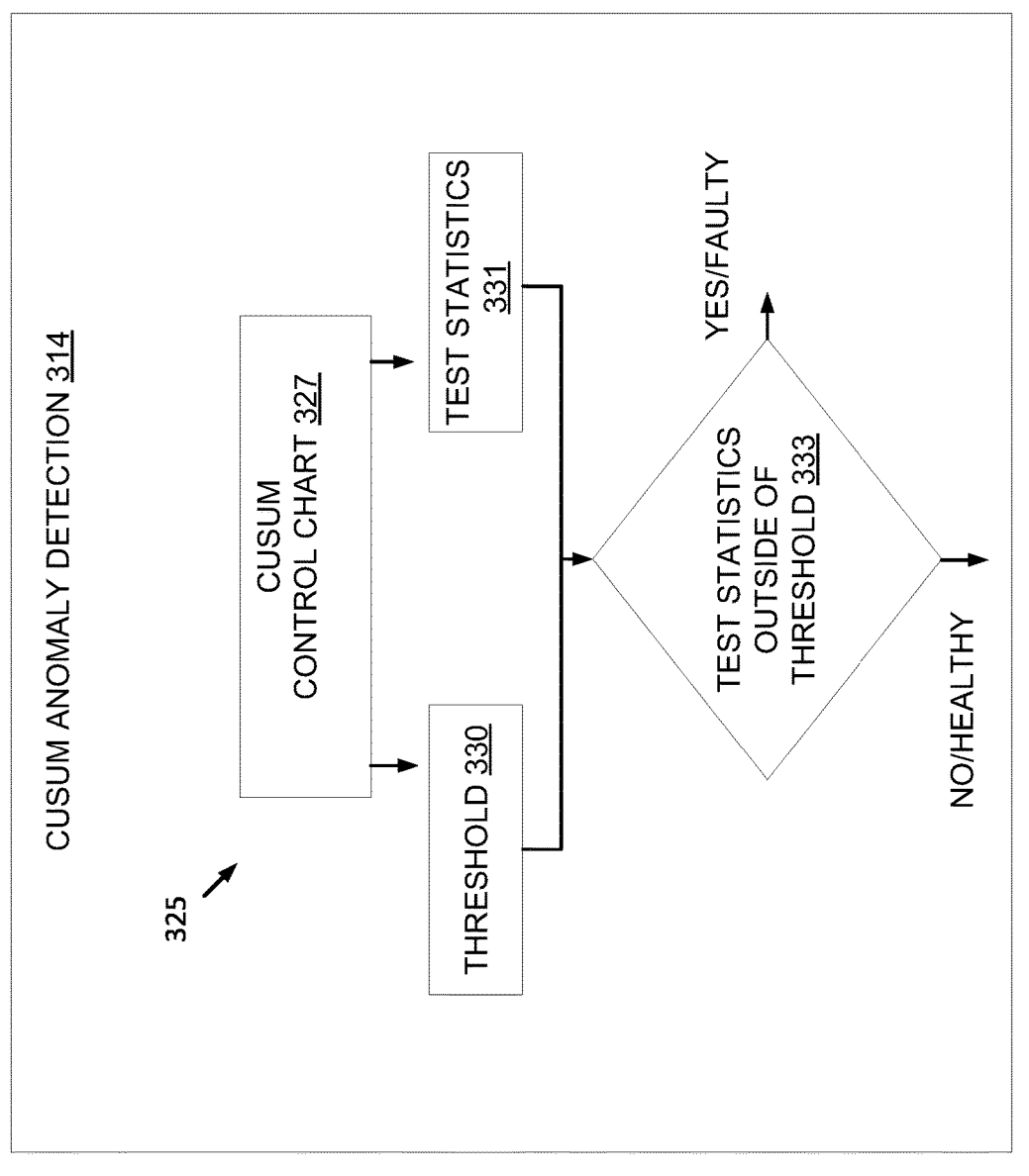
FIG. 3B illustrates an example computing module for performing anomaly detection according to aspects of the present disclosure.
Figure 3C:
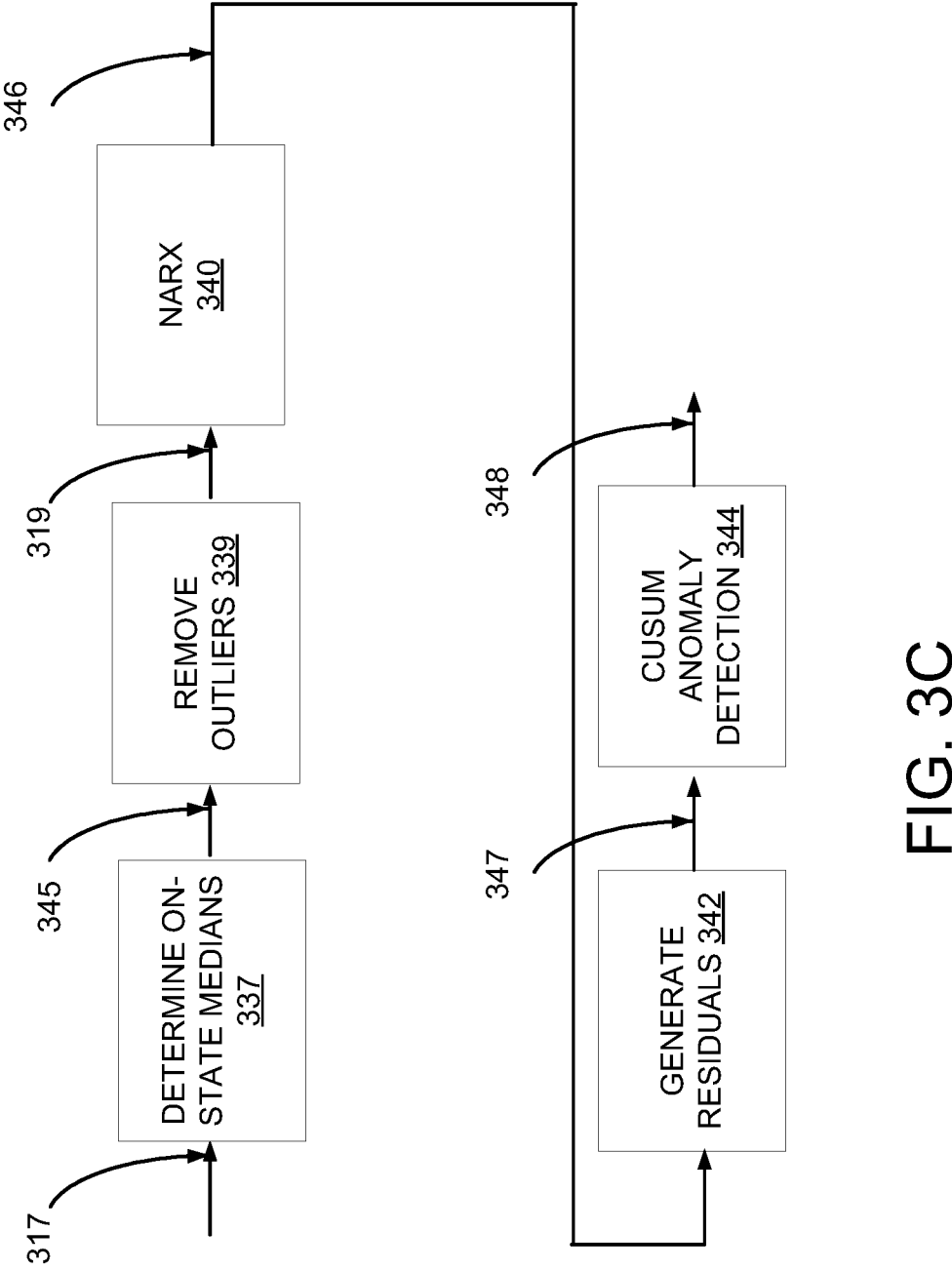
FIG. 3C illustrates and example workflow to be performed by computing modules, the workflow associated with predicting and detecting failures of power electronic devices in accordance with example embodiments.
Figure 3D:
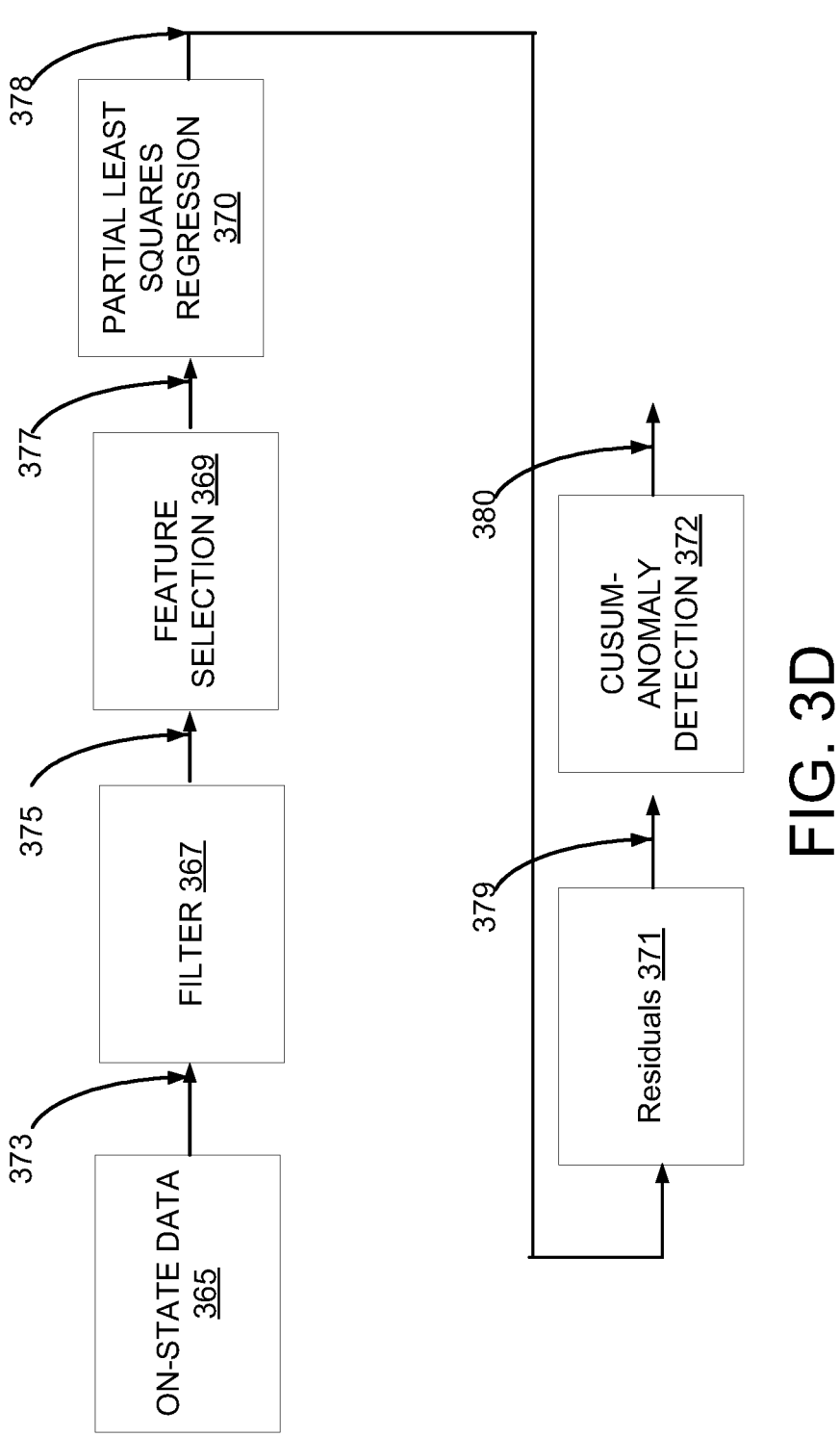
FIG. 3D illustrates another example workflow to be performed by computing modules, the workflow associated with predicting and detecting failures of power electronic devices in accordance with example embodiments.

Further details regarding the NARX and PLS model that can be implemented by the machine learning module 310 will be explained with reference to FIGS. 3C-3F, where FIG. 3C shows a workflow focused around the NARX model and FIG. 3D shows a workflow that applied the PLS model. Workflows shown in FIG. 3C and FIG. 3D can be implemented in parallel. In other examples, values generated by workflow of FIG. 3C can be used to train the models used in workflow FIG. 3D and vice versa.

The output 321 of the NARX and/or PLS module can include one or more predicted values ŷ(t) for one or more of each of the switching parameters. These outputs 321 can be generated by one or more neural networks.

In example embodiments described herein, a model is learned from data to describe the nominal behavior of the system. A residual(s) generation module 312 can be configured to generate one or more residuals 322 for the switching parameters. A quality index, e.g., residual is used to compare the predicted output based on the nominal model and the actual output measurement to detect anomalies. In other words, residuals 322 are true values for the one or more switching parameters (i.e. as determined by sensing module 206 and/or as processed by pre-processing module 307) minus predicted values (i.e. as generated by the machine learning module 310). In some embodiments, the residuals are expected to be near zero and are only subjected to noise, component tolerances and disturbances in fault-free devices, but deviate from zero substantially in the presence of faults in the system. The residuals are calculated as: $r(t)=y(t)-\hat{y}(t)$, where y(t) are the measurements, and ŷ(t) are the predicted values at time t. For example a residual for the drain-source current $I_{DS}$, can be calculated as $r_{I_{DS}}(t)=I_{DS}(t)-\widehat{I_{DS}}(t)$.

The residuals 322 can be provided to the CUSUM anomaly detection module 314. Although one module is shown 314, it is understood that multiple modules can exist, for example one corresponding residuals for the NARX, the other corresponding residuals for the PLS of machine learning module 310. The CUSUM anomaly detection module 314 can be configured to perform sequential change-point detection according to one or more change-points, or changes in the residuals. This can include by application of CUSUM test, including to monitor shifts in the mean and/or variance. The CUSUM anomaly detection module can be configured to generate an anomaly signal or a fault/no fault signal 323 or flag. Fault/no fault signal 323 may be representative of one or more detected faults, or the onset of one or more expected fault. Fault/no fault signal 323 can also be indicative of the type of fault (e.g. open circuit, short circuit, gate current leakage), and/or of the cause of the fault. Fault/no fault signal 323 need not be a binary signal, but can include any information related to the onset of potential faults, such as predicted timing or on-set of the fault, and/or the type of fault.

It can be understood that multiple such signals may be generated, for example, based on the predicted value of the switching parameter. It can also be understood that fault/no fault signal 323 can be generated for each of the type of switching parameter that was predicted. For example, for the IDS and/or the RDS. For example a first signal can correspond to residuals 322 generated for IDS, while another can correspond to residuals 322 generated by for RDS. As another example a first signal can correspond to residuals 322 generated by the NARX model, while another can correspond to residuals 322 generated by PLS model. It can also be understood that while a fault/no fault signal can be generated for each comparison to a threshold (which will be shown with reference to FIG. 3B), many of the signals can generate an ultimate fault/no fault signal. It can be understood that the fault/no fault signal 323 (or any combination of multiple signals, for example for mitigating false alarms) can be used by the fault detection and control circuit 200 shown in FIG. 2 in order to detect, control, and/or mitigate one or more faults.

Sequential change-point detection is concerned with the design and analysis of techniques for quickest on-line detection of a change in the output signals, subject to a tolerable limit on the risk of a false alarm. In this vein, predictions of the output signals 321 from NARX and/or PLS models enable computing deviations from the actual observations, termed residuals (actual minus predicted) 322, which form the basis for changepoint detection. Residuals can be "small" as long as the behavior of the sensed switching device is normal. In sequential detection, with every new residual 322, one is faced with the question of whether to let the device to continue to operate or if the statistical behavior of the residual is believed to have altered, the goal is to detect the change as quickly as possible. The change-point is not known in advance.

Cumulative sum (CUSUM) test (also known as quickest detection test), can be used to monitor shifts in the process mean and variance. Processes characterized exclusively by the presence of natural variability are said to operate in the "in-control" condition; when a special cause occurs, the process state is said to be "out-of-control." In the case of residuals 322 with respect the switching parameters, the "in control" data may correspond to data that signifies healthy or not-faulty PE for which the switching parameters correspond to. In the case of residuals 322 with respect the switching parameters, the "out of control" data may correspond to data that signifies faulty or unhealthy PE for which the switching parameters correspond to.

Further details on the CUSUM test is shown in reference to FIG. 3B.

FIG. 3B shows further details with respect to CUSUM anomaly detection module 314, including a workflow 325 that can be applied by CUSUM anomaly detection module 314. The workflow 325 may include applying the residuals 322 (which can be actual real time data for the residuals, as well as training data for the residuals) to a CUSUM control chart 327. A threshold 330 can be compared to a test statistic 331, and the outcome of the comparison 333 can be used to determine if the process is operating "in-control" or "out-of-control." For example, if the test statistic 331 is outside of the threshold 330 as determined by the comparison 333, in terms of PE, that could signify "out-of-control" switching parameters and/or one or more faults in the respective PE. As another example, if the test statistic 331 is within the threshold 330 as determined by the comparison 333, in terms of PE, that could signify the switching parameters are "in-control" and/or the respective PE are healthy. Threshold h can be predetermined based on the desired detection delay and risk of false alarm. It is understood that the value of the threshold h can depend on the amount of data points available after the anomaly happens. It can be understood that there can be one or more thresholds, where the comparisons with each threshold, and information gleaned therefrom, can be indicative of information related to the presence of the fault (or not).

As previously alluded to, the CUSUM test may be able to detect changes in the mean (CUSUM-mean) and/or variance (CUSUM-variance or CUSUM-$S^2$) over time. CUSUM test can be used to detect two-sided shifts in both the process mean and variance and is able to identify the change points rapidly and accurately.

With respect to CUSUM-mean test, for a time sequence data $X(t)(t-1, 2, 3, \ldots n)$ which follows the normal distribution, the null hypothesis can be defined such that $X \sim N(\mu_0, \sigma_0)$. The CUSUM-mean test keeps track of the process mean $\bar{X}(t)$ over t samples:

$$\bar{X}(t) = \frac{1}{w}\sum_{j=0}^{w-1} X(t-j),$$

where $\bar{X}(t)$ is the $t^{th}$ sample mean, w is the window length (i.e. in samples). Example windows are 10-1000 and can depend on the data size. To monitor an increase in mean values from the in-control level $\mu_0$ to a larger or lower mean $\mu_1$ the following quantities can be calculated as:

$$C+(t)=\max(0,C+(t-1)+\bar{X}(t)-\mu_0-k)$$

$$C-(t)=\max(0,C-(t-1)+\bar{X}(t)-\mu_0-k)$$

In the above equations, $$k = \frac{\delta\sigma_0}{2},$$

$\delta$ is the amount of shift on the process mean that should be detected expressed as a multiple of the standard deviation of the data points (which are the sample means). When either $C^+(t)$ (high CUSUM value) and/or $C^-(t)$ (low CUSUM value) exceed(s) the threshold h, the process may be out of control. The shift $\delta$ and threshold h, can be predetermined based on the desired detection delay and the risk of fake alarm. The high CUSUM value. (upper statistic) may be able to detect a positive anomaly and low CUSUM value (lower statistic) may be able to detect a negative anomaly. If the If the process mean shifts upward, the upper CUSUM test statistic will eventually drift upwards, and vice versa if the process mean decreases.

As alluded to above, the CUSUM test is also able to detect changes in variance over time. For a Gaussian time sequence data $X(t) X(t) (t=w, 2, 3, \ldots n)$, the null hypotheses may be defined such that $X \sim N(\mu_0, \sigma_0)$. The CUSUM-variance test may be used to detect changes in the process variance and may involve computing the sample variance $S^2(t)$ for $(t-w, 3, \ldots n)$ as follows:

$$S^2(t) = \frac{1}{w-1}\sum_{j=0}^{w-1}\left(X(t-j) - \bar{X}(t)\right)^2.$$

To monitor an increase in variance from the in-control level $\sigma_0^2$ to a larger variance $\sigma_1^2$ ($(\sigma_0^2 < \sigma_1^2)$, the CUSUM test statistic $C^+(t)=\max(0, C^+(t-1)+S^2(t)-k)$ can be used. The CUSUM test statistic $C^-(t)=\min(0, C^-(t-1)+S^2(t)+k))$ can be used for capturing a downward shift in variance $(\sigma_0^2 > \sigma_1^2)$, where $$k = \frac{2\ln\frac{\sigma_1}{\sigma_0}\sigma_0^2\sigma_1^2}{\sigma_1^2 - \sigma_0^2}.$$

A high-side CUSUM chart (see CUSUM control chart 327 in FIG. 3B) can be used to detect an increase in variance $\sigma^2$ and to issue and out-of-control signal at the first t for which $C_t^+ > h^+$. Limit or threshold $h^+$ can be obtained using a parameter chart. A low-side CUSUM chart can used to detect a decrease in variance $\sigma^2$. It may issue a signal at the first t for which $C_t^- > -h^-$. With reference to FIG. 3B, example threshold(s) 333 may be $(-h^-, h^+)$, where comparison 333 may compare the test statistic 331 (i.e. $C_t^+$ and/or $C_t^-$) with the threshold 330, and the CUSUM control chart 327 may include the respective high side and/or low side CUSUM control chart 327.

NARX Workflow

FIG. 3C shows an example work flow 335 that may be implemented on sensed data 317 by one or more modules of fault detection and prediction engine 210 and utilizing a NARX model. The work flow 335 may include one or more processes, including determining on-state medians 337, removing outliers 339, applying a NARX model 340, generating residuals 342, and performing CUSUM anomaly detection 344. The work flow 335 may include one or more processes related to pre-processing. For example, the work flow 335 can include determining on state medians 337 and/or removing outliers 339 from the determined on-state medians 345. It can be understood that determination of on-state medians 337, and removal of outliers 339 can be executed by pre-processing module 307, and in any order. In real time, it can be understood that outlier values which are some standard deviation away from a median or mean value (e.g. by Z-score analysis), in some rolling time or sample window, can be removed. It other embodiments, outlier data points can be assumed to be too close (in time or sample) to the start and/or stop of the on-state, or otherwise be related to device response profile.

It can be understood that the data set and switching parameters that can be used can include any combination of parameters, such as temperature, VGS, IDS and VDS, RDS(ON), It can also be understood that type and/or extent (if any) of preprocessing can differ depending on the type of switching parameter being preprocessed by pre-processing module 307.

The processed data 319 can be provided to the NARX model 340. The NARX model 340 may be configured to generate one or more predicted values 346 for one or more of the switching parameters. The NARX model may be implemented by neural network. As such, the below analysis should also be interpreted with reference to example neural network shown in FIG. 3F.

The NARX model may use the past values of the same series, drain-to-source voltage (VDS), drain-to-source current (IDS), drain-to-source resistance RDS(ON) temperature (T), and the past and current values of the exogenous input, the gate voltage (VGS) as the input. After pre-processing 319, a one-step delay non-linear auto-regressive model can be applied to predict the current on-state median sample of the switching parameter, such as of temperature, IDS(t) and VDS(t), RDS(ON)(t). The prediction may be based on the values for previous samples of those switching parameters and the present VGS(t). For example, it could be based on the past sample of the temperature, IDS(t-1) and VDS(t-1), RDS(ON)(t-1).

The nonlinear auto-regressive with exogenous (NARX) inputs neural network, a dynamic artificial neural network (DNN) with delays, can serve as a good predictive model of time series signals of switching devices. The NARX model uses delays to model the dependence of the current (on-state median) output on the current and previous values of the exogenous (on-state median) inputs (e.g. features) and previous values of the (on-state median) output. For example, the NARX model use inputs to the NARX model X and Y, where X=[Vgs] and Y=[Vds, Ids, T, Rds]. X(t) and Y(t−1) can be used to predict $\hat{y}$(t).

Consider a discrete-time multi-variable nonlinear system with m exogenous inputs, u and r outputs, y:

$$\hat{y}(t)=f[u(t-D_u), \ldots ,u(t-1),u(t),y(t-D_y), \ldots ,y(t-1)]+v(k)$$

$$u(t)=[u_1(t),u_2(t), \ldots ,u_m(t)]^T$$

$$y(t)=[y_1(t),y_2(t), \ldots ,y_r(t)]^T$$

$f(\cdot)$ is a nonlinear function, u(t) is a vector of exogenous inputs, y(t) is the vector output at time t and, $y(t-D_y)$, . . . , y(t−1) are the previous values of the output, $D_u$ and $D_y$ are the delay order of input and output and v(k) is the noise vector. In the context of modelling switching devices, y(t) could represent a switching parameter such as RDS(ON), and u(t) could represent Vds, Ids, Vgs, Vbd, or T The mapping function $f$ may be unknown, but can be is approximated by a Mufti-Layer Perceptron (MLP). In layer j, input vector $x_j$, an output of the previous layer (j−1), is multiplied by a weighted vector $w_{ij}$. Then the output of neuron i of layer j is given by actuation function $\Psi$ as the equation:

$$z_i = \Psi\left(\sum_{j=1}^{n} x_j w_{ij}\right).$$

The weight parameters are optimized to minimize the mean square error between the observed output and model via a stochastic gradient descent method or their accelerated versions. The gradient may be computed by back-propagation.

Figure 3E:
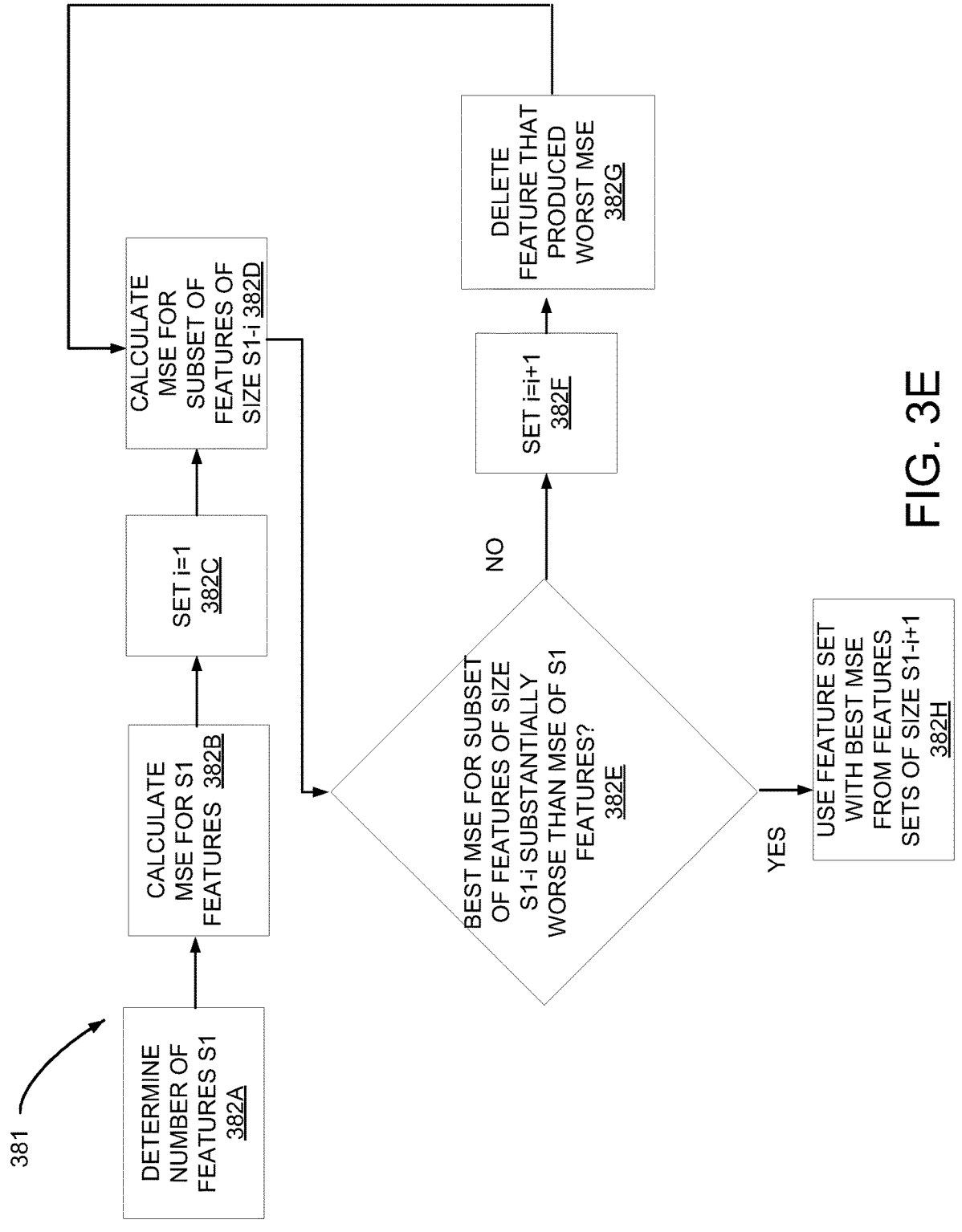
FIG. 3E illustrates an example workflow for feature (e.g. switching parameter) selection associated with predicting and detecting failures of power electronic devices in accordance with example embodiments.
Figure 3F:
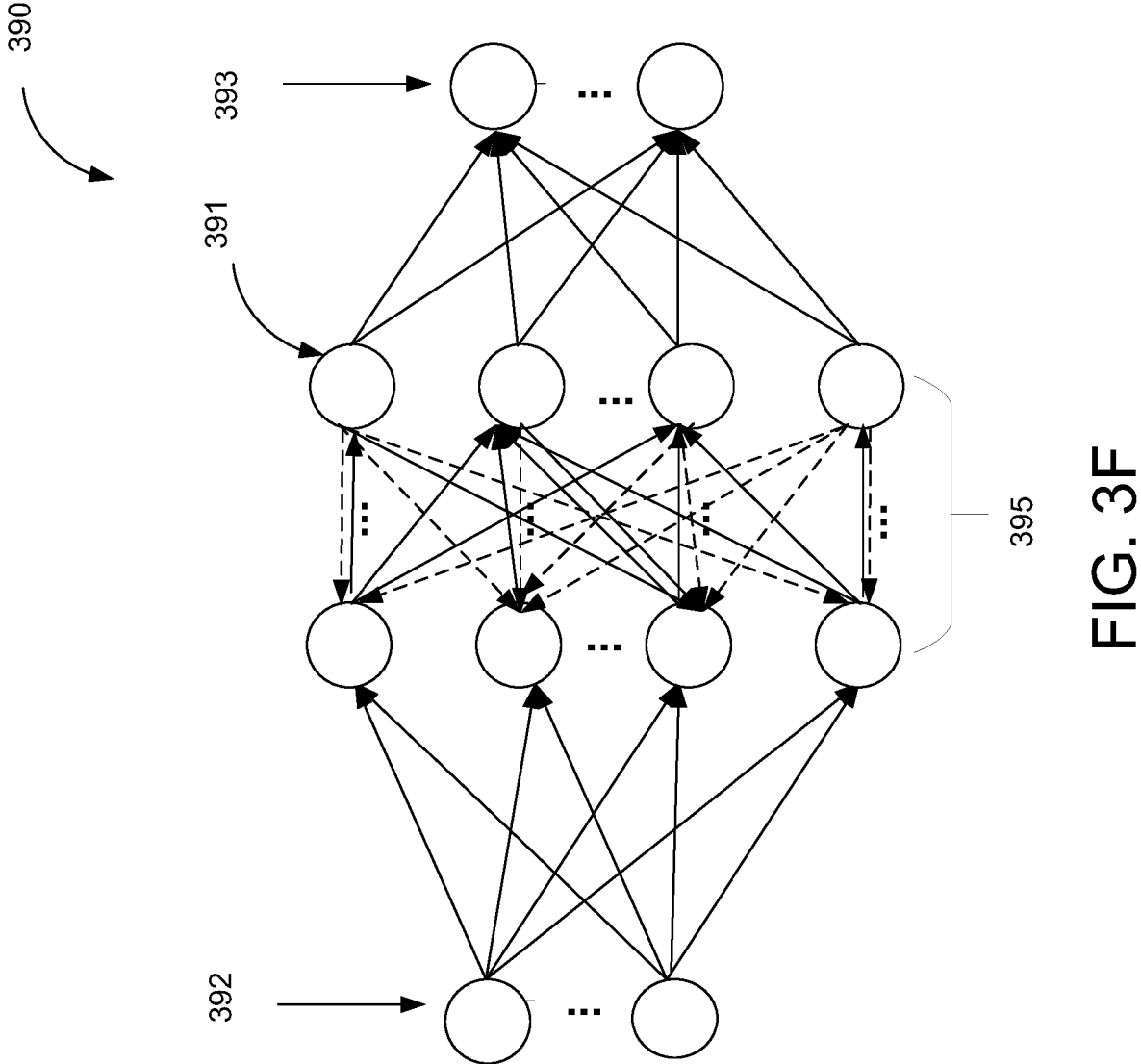
FIG. 3F illustrates an example neural network for performing aspects of workflows associated with predicting and detecting failures of power electronic devices in accordance with example embodiments.

It is understood that the NARX can be calibrated based on training data (e.g. with healthy and/or unhealthy devices), and further details will be shown with reference to the neural network in FIG. 3F.

The residuals are then calculated. The predicted values 346 can then be provided to the residual(s) generation module 312 which is configured to generate residuals 342. As described herein, residuals can correspond to the true values (i.e. as detected at time step t) minus the predicted values 346. As previously described with reference to FIG. 3A, the residuals can calculated as: r(t)=y(t)−$\hat{y}$(t), where y(t) are the measurements, and $\hat{y}$(t) are the predicted values 319 as predicted by the NARX 340 at time t. For example a residual for the drain-source current $I_{DS}$, can be calculated as $r_{I_{DS}}(t)=I_{DS}(t)-\widehat{I_{DS}}(t)$.

The generated residuals 347 can be provided to the CUSUM anomaly detection module 314 for performing CUSUM anomaly detection 344. The CUSUM anomaly detection 344 may be configured to detect changes the variance of the residuals, for example as discussed with reference to FIG. 3B and as previously discussed. Example window sizes for CUSUM-variance include 10-1000 and can depend on the data size.

PLS Workflow

FIG. 3D shows an example work flow 364 that may be implemented by one or more modules of fault detection and prediction engine 210 and utilizing a PLS model. As previously alluded to, PLS may allow for more robustly address any correlation between electronic device parameters Vds, Ids, Vgs, Rds. The work flow 355 may include detection of on-state data 365, application of a filter 267, feature selection 369, for example by dynamic programming (GPTIPS), application of partial least square regression PLS 370, determination of residuals 371, and CUSUM anomaly detection 372.

The on state data may be determined 365 from the sensed data 317, for example by way of sensing during a timing event or on-state trigger, edge detection, etc. The on-state data 373 (e.g. from sensed data 317 as shown with reference to FIG. 3A or from on-state data determination 365) may be noisy. As such, a filter may be applied 367. The filter can be, for example, a one-dimensional filter as previously described to filter out noise. The filter can be a moving average (MAF) filter having a feed-forward filter order $n_b$=10, 20, 30, 40, or 50, for example. It is understood that any number of pre-processing 307 may be performed.

Prior to passing inputs to the PLS regression 370, features can be selected 369. As shown above with reference to FIG. 1, $I_{DS}$ as modelled is not linearly related to the other terms, such as $V_{GS}$. Repeated again here, $$I_{DS} = a_0 + a_1 V_{GS} V_{DS} + a_2 V_{GS} + a_3 V_{GS}^2 + a_4 V_{DS} + a_5 T.$$

Thus, feature transformation and selection are needed to deal with the non-linearity and avoid the influence of irrelevant variables.

As shown in the model for $I_{DS}$, the transformed features are $$[V_{GS} V_{DS}, V_{GS}, (V_{GS}^2, V_{DS}, T].$$

$V_{BD}$ can also be used. Backward feature selection based approximate dynamic programming, which will be explained in more detail below, can be used to select the most salient transformed features.

The results of such backward feature selection based approximate dynamic programming can produce a (ranked) list of optimal features (i.e. a subset of features).

For feature selection, it can be understood that values for known healthy devices and/or unhealthy devices can be continuously updated, so that the features selected can be continuously updated by comparison to values for heathy and/or unhealthy switching devices. It can also be understood that information on the type of device (e.g. serial number, chemistry, intended use, etc.) may be useful in making this determination.

In examples, the features can be selected from the six features $V_{GS} V_{DS}$; $V_{GS}$; $V^2_{GS}$; $V_{DS}$; $V_{BD}$; and T. For example, for one example device, if the five features $V_{GS} V_{DS}$; $V_{GS}$; $V^2_{GS}$; $V_{DS}$; T are used, a mean-square error 0.0312 (compared to healthy device data, which is obtained in training, and/or as otherwise confirmed) may be generated. In other examples of the same device, a selection of four features, namely $V_{GS} V_{DS}$; $V^2_{GS}$; $V_{DS}$ may yield a mean square error of 0.0337. In comparison, a selection of four features from the five, where the four features are $V_{GS} V_{DS}$; $V_{GS}$; $V_{DS}$; and T may yield a mean square error of 0.173. In other embodiments the features $$V_{GS}^2, V_{BD} \text{ (or } T), \text{ and } V_{DS}$$

may have an MSE of 0.0365. In other examples, a selection of features $V^2_{GS}$ and $V_{DS}$ may yield a MSE of 0.377. Likewise, the selected $$V^2_{GS}, V_{BD}$$

(or T) may yield a MSE of 0.294.

A dynamic programming approach for feature selection can be utilized to select the optimal features to provide to the PLS model. As alluded to previously, feature selection can be informed by physics-based models so that informative signals 377 and theft transformations can be used as inputs to the PLS 370.

Dynamic programming is a multistage optimization technique and used to simplify a complicated problem by breaking it down into simpler sub-problems in a recursive manner. Dynamic programming may be used for feature selection among many features. In example embodiments, feature selection can be informed by physics, to represent the circuit behavior under nominal operation.

In data-driven methods, selecting parsimonious and efficacious features is often better because it enables learning faster, reduces model complexity and over-fitting, improves the accuracy of model predictions and makes it easier to interpret and explain the model. In developing PLS models to predict one switching parameter, such as $I_{Ds}$ from the other measured signals for switching parameters, one can consider a number of features, such as $V_{GS}V_{DS}$; $V_{GS}$; $V^2_{GS}$; $V_{DS}$; $V_{BD}$; and/or T or TC as potential inputs to the estimator. The problem of selecting a ranked subset of k-best features (i.e., input signals and their transformations for predicting a desired output signal) from a given set of N features (k≤N) could be solved using branch and bound or dynamic programming (DP) or heuristics.

Dynamic programming is a multistage optimization technique used to simplify a complex problem by decomposing it into simpler sub-problems, and solving the original problem in a recursive manner. The concept of principle of optimality that states that the subsolutions of an optimal solution of the problem are themselves optimal solutions for their subproblems, in conjunction with a recursive functional equation that relates a solution to its subsolutions are fundamental to DP. The functional equation of DP enables one to choose a ranked subset of features of specified cardinality with the maximum effectiveness (e.g., minimum mean square error between nominal data and nominal model predictions).

For example a workflow 381 corresponding to feature selection 367 with steps for determining salient transformed features can include step 382A for determining the number of features, such as switching parameters or other information available to the system (such as on state data 373, sensed data 317, and/or filtered data 375 with reference to FIG. 3A and FIG. 3D). The number can be S1.

Let $F=(f_1, f_2, \ldots, f_N)$ be the set of available features, $X_i$, (i=1, 2, . . . , k) be a subset of i features; there will be $$\binom{N}{i}$$

such sunsets for each i. To select a subset of k best features among the entire set F, dynamic programming considers the subproblems of selecting i-best features, (i=1, 2, . . . , k). The recursion also facilitates the ranking of the efficacious features by tracing best feature subsets from stages i=1, 2, . . . , k.

Let J ($X_i$) be the cost of subset $X_i$. Note that the cost (e.g., Mean square error (MSE)) depends only on the feature membership of $X_i$, and not on their order. To guarantee optimality of DP, the performance criterion, J, is assumed to be a strictly monotonic function of i. If this assumption is not valid, then order matters in cost computation and DP becomes a suboptimal feature selection method because exhaustive search with factorial complexity is needed for optimal feature selection with non-monotonic functions. The forward DP equation for selecting the i-best features based on the MSE of a nominal model proceeds for i=1, 2, . . . k with $X_0=\emptyset$ as follows:

$$J(X_i^*) = \min_{X_i \in F} J(X_i) = \min_{X_{i-1} \in F} \min_{\substack{f \in F \setminus X_{i-1}; \\ X_{i-1} \cup f = X_i}} J(X_{i-1} \cup f)$$

The optimal feature subset $$(X_i^*)$$

is given as:

$$X_i^* = \arg \min_{X_1 \in F} J(X_i);$$

$$f_i^* = X_i^* \setminus X_{i-1}^*.$$

Once i best features for (i=1, 2, . . . k) are available, one can glean the ranking of features by traversing the subsets in the optimal feature subset in a reverse order for i=k, k−1, . . . , 1. A feature of dynamic programming is that it provides the best feature subset for every Unfortunately, implementation of such a search scheme requires an enormous amount of computation, especially for large N. Indeed, one can consider $$\sum_{k=1}^k \binom{N}{i}$$

non-empty subsets of features, and train and evaluate the concomitant models.

Note that DP can be implemented as a backward recursion for i=N−1, N−2, . . . , k with $X_N=F$ as follows:

$$J(X_i^*) = \min_{X_i \in F} J(X_i) = \min_{X_{i+1} \in F} \min_{\substack{f \in X_{i+1}; \\ X_i = X_i+1 \setminus f}} J(X_{i+1} \setminus f)$$

Note that ranking of features with the backward method requires the recursion to be computed for i=N 1, N 2, . . . , 1 with computational complexity O($2^N$ 1). Given the exponential complexity of DP, one can also consider 'backward' and 'forward' feature selection methods, also known as the 'knock-out' strategies. Compared with the dynamic programming method, 'knock-out' strategies do not need to search all $$\sum_{i=1}^{k} \binom{N}{i}$$

combinations of features, but need to consider only $$1 + \sum_{i=k}^{N-1}(i+1)$$

subsets for the backward feature selection method, and $$\sum_{i=1}^{k}(N-i+1)$$

subsets for the forward feature selection method.

Backward and forward feature selection can be approximated as approximate dynamic programming. To avoid the exponential computational complexity of the optimal DP algorithm, one could reduce the search space by fixing, at each stage i, the optimal feature subset from stage (i−1). This search process can be realized by starting with all the features and deleting one least effective feature at a time until k features are left, or starting with a null set and adding the highest effectiveness feature at a time to the current feature subset until k features are in the subset; the former is called backward feature selection method, while the latter is termed the forward feature selection method.

The backward 'knock-out' strategy begins by evaluating the effectiveness of the subset containing all N features and 'knocks out' the least effective one (i.e., the feature that increases the MSE the least) at each stage, i=N−1, N−2, . . . , k. Starting with the complete set F=($f_1$, $f_2$, . . . , $f_N$), the feature $$f_i^*$$

that results in the least decrease in effectiveness (i.e., the least increase in MSE) can be deleted from F. This process is continued until the desired number of features k is reached. The number of possible subsets at the $i^{th}$ stage is N−i+1 and to select best k features, one needs to evaluate $$1 + \sum_{i=k}^{N-1} i + 1 = 1 + \frac{(N+k+1)(N-k)}{2}$$

subsets. The least effective feature at stage i=N−1, N−2, . . . , k can be:

$$X_i^* = X_{i+1}^* \setminus f_i^*$$

$$f_i^* = \arg\min_{f \in X_{i+1}^*} (J(X_{i+1}^* \setminus f_i) - J(X_{i+1}^*)) = \arg\min_{f \in X_{i+1}^*} (J(X_{i+1}^* \setminus f_i))$$

The initial feature subset is:

$$X_N^* = F.$$

Indeed, the backward feature selection via the equation for $$f_i^*$$

above is an approximation to the DP recursion in $$J(X_i^*)$$

above where minimization over $X_{i+1}$ is replaced by the subset $$X_{i+1}^*,$$

thereby reducing the computational complexity to a quadratic function in the number of features. Feature ranking with backward feature selection method, however, requires search process to be continued until k=1. The order of importance of k features using the backward feature selection would be $$f_1^*, f_2^*, f_3^*, \cdots f_k^*.$$

The computational complexity for ranking and selection in this case is $$\frac{N(N+1)}{2}.$$

Since equation for $f_i^*$ above can be can be viewed as an approximate DP recursion, the backward feature selection strategy can be used as a base heuristic in rollout and Monte Carlo Tree Search-based approximate dynamic programming algorithms to provide near-optimal feature subsets.

The forward feature selection is basically a bottom up approximate dynamic programming search procedure in the equation for $$J(X_i^*)$$

above which adds a new best feature to the current feature set at each stage. At each iteration i (i=1, . . . , k), forward feature selection strategy selects the optimal feature $f_i^*$ that provides the largest efficacy, e.g., largest decrease in MSE, and adds it to the set of already selected variables, denoted by $$X_{i-1}^*,$$

initialized to be the empty set $X_0 = \emptyset$. The selection process ends when adding new features does not improve the performance significantly or the desired number of selected features k is reached. At stage i forward feature selection method requires the evaluation of (N−i+1) feature subsets and the total number of subsets to be searched is $$\sum_{i=1}^{k} (N - i + 1) = \frac{(2N - k + 1)k}{2}.$$

The subset of i optimal features is:

$$X_i^* = X_{i-1}^* \cup f_i^*.$$

The most effective or optimum feature $$f_i^*$$

at the i th stage for i=1, 2, . . . , k is:

$$f_i^* = \arg\min_{f_i \in F \backslash X_{i-1}^*} J(X_{i-1}^* \cup f_i).$$

The equation for $$f_i^*$$

above can represent a forward feature selection method and can be a heuristic for rollout and Monte Carlo Tree Search-based approximate dynamic programming algorithms to provide near-optimal feature subsets. A workflow for feature selection 369 according to the backward "knock-out" method is shown with more detail with reference to FIG. 3E.

PLS 370 may be used to generate predicted values 378. The PLS model can be implemented on a neural network, an example of which is provided in FIG. 3F. Unlike the traditional least squares regression models, which assume that only the output is corrupted by noise, the Partial Least Squares (PLS) regression model assumes that both inputs and outputs can be corrupted by noise. PLS is particularly useful when the inputs are highly correlated and large in number and can be an alternative to multiple linear regression and principal component regression methods.

PLS regression has connections to conjugate gradient methods used in optimization. PLS characterizes the latent spaces of both inputs and outputs and finds the regression coefficients from the resulting input-output latent space representations. Thus, the PLS regression projects the input feature (predictor) variables and the measured output variables to their respective input and output latent spaces by maximizing the variance of the output variables explained by the input variables or equivalently maximizing the covariance between input and output. Formally, let X be an n×m matrix of input predictors (X∈R_^(n×m)) and Y an n×p matrix of output responses (Y_^∈R_^(n×p)). The PLS algorithm extracts input and output factors successively from both X and Y, respectively, to maximize the covariance between the input and output, Specifically, PLS algorithm projects the X and Y into uncorrelated into uncorrelated latent components of two sets of weights denoted by T and U to maximize the covariance between X and Y (or equivalently, covariance between T and U) as follows:

X=TP$^T$+E and Y=UQ$^T$+F, where T∈R$^{n \times r}$ and U∈R$^{n \times r}$ are projections of X (X-scores) and Y, (Y-scores) respectively. P∈R$^{m \times r}$ and Q∈R$^{p \times r}$ are orthogonal loading matrices of the input X and the output Y respectively. E∈R$^{n \times m}$ and F∈R$^{n \times p}$ are PLS model residuals corresponding to X and Y, assumed to be independent and identically distributed random normal variables. The number of latent variables l can be estimated by using cross-validation or some other techniques. The PLS method finds the weight vector w, c, such that $$[\text{cov } (t, u)]^2 = [\text{cov } (Xw, Yc)]^2 = \max_{||a||=||b||=1} [\text{cov } (Xw, Yc)]^2,$$

where [cov(t,u)]=t$^T$u/n denotes the covariance between the score vectors t and u. Multiple algorithms are available to compute the score and loading matrices, the most popular being the Nonlinear Iterative Partial Least Squares (NIPALS) algorithm that extracts the X-scores and its loading factors and Y-scores and its loading factors, successively one at a time, and successive singular value decomposition of the cross-covariance matrix between input and output using deflation. Once T, P, U, Q matrices are computed, the linear regression model relating the input X and the output Y involves finding β by solving U=Tβ, where β represents the regression matrix. Substituting the model into the equation for [cov(t,u)]$^2$ above, obtains Y=UQ$^T$+F=TβQ$^T$+F=XPβQ$^T$. As such, P, Q, and β can be used to predict y for a given x.

Residuals 379 e.g. of Ids, are calculated 371. The residuals can be true values minus the predicted values 378, including as described with reference to FIG. 3A. These residuals 379 are then provided as inputs for performing CUSUM anomaly detection 372. CUSUM anomaly detection can be performed as described with reference to FIG. 3A and FIG. 36. A CUSUM control chart can which model the mean of the signal (e.g. of the residuals 379) (CUSUM-mean), to evaluate the health status of the switching devices. The signal's mean may be able to capture the saturation levels as the health status of devices changes from healthy to degraded and finally to failed. The CUSUM anomaly detection 372 can provide a signal 380 corresponding to the health status of the PE or switching devices, such as a fault/no fault signal 328, 348, as previously described with reference to FIGS. 3A-3C, which can similarly be utilized by fault detection and control circuit 200.

As previously alluded to, a neural network is able to capture nonlinear behavior. Neural networks as used herein with reference to NARX and/or PLS models can include non-linear neural regressive neural network, so that the non-linear behavior of switching parameters such as Vds, Vgs, Ids, and Rds can be captured. It may be useful to describe example neural networks which embodiments of the present disclosure can utilize.

FIG. 3E shows further details on a workflow for feature selection 369 and dynamic programming that can generate informative signals 377 and their transformations which can be used as inputs to the PLS.

The workflow 381 can include step 382B for determining the MSE for those features. The MSE can be determined for a subset having those five features. The workflow 381 can include step 382C for setting a variable i to 1 or otherwise initializing a recursion. The workflow can include step 382D for calculating the MSE for the subset of features having size S1−i, where i here is limited to the discussion of workflow

381 and not to be confused with prior mention of i. For example, for i=1, if there are 5 possible features (S1=5) there would be five possible subsets having size 4 (or S1−1). The workflow 381 can further rank the subsets having the size S1−i by MSE (for example the lowest MSE would be the best, the highest would be the worst). The workflow 381 can further include a step 382E for determining if the best (e.g. smallest) MSE differs substantially from the MSE of the subsets of size S1 (e.g. the best MSE from the subsets of size S1 as determined at step 282B). For example, it can be more than 95%, 90%, 80%, 65%, 50%, 33%, 30%, 25%, 15% different. In other embodiments, the step 382E can determine if the best (e.g. smallest) MSE of the subsets of size S1−i differs substantially from the MSE of the subsets of size S1−i+1 (e.g. the best MSE from the subsets of size S1 as determined in a prior recursion or at step 382B). For example, it can be more than 95%, 90%, 80%, 65%, 50%, 33%, 30%, 25%, 15% different. If it does not, the workflow 381 can include step 282F for initializing the next recursion by increasing i by 1. The workflow 381 at step 382G can optionally further delete or "knock out" the feature (i.e. at step 382D) which produced the worst (i.e. highest) MSE. At step 382G, the workflow can optionally further delete or "knock out" two or more features (i.e. at step 382D) if there were multiple features, which produced bad (i.e. high) MSE. The workflow can then repeat to step 382D. In other words, when making the determination 382E a subsequent time, the workflow 381 can include leaving as deleted (i.e. not including in the subsets used) the feature which for the subsets of size S1−i, when deleted, yielded the worst MSE. That way the number of options of subsets in the following recursion are reduced increasing the speed of determining the features to select. If at step 382E, the answer is yes, the workflow 381 at step 382E, the features yielding the best (least) MSE from the subset having size S1−i can be used.

It can be understood that the number and/or types of features selected can depend on the mean square error, and/or the type of device selected. It can be understood that dynamic programming and forward feature selection can produce same and/or similar optimal and/or ranked feature subset. In one example implementation, the work flow would include evaluating the MSE of models based on different subsets selected from a group of values of switching parameters that are available. For example, the selection can be made by evaluating different subsets selected from $\{V_{GS}\ V_{DS},\ V_{GS},\ V_{GS}^2,\ V_{DS},\ V_{BD},\ T\}$. It can be understood that every subset from that group can be evaluated. It can also be understood that the subset with the least MSE can be selected, or that an optimal feature set of size 1, 2, 3, 4 or 5 can be selected. In other embodiments, the feature set having a dramatic difference between a feature set of a first size compared to the next largest size may be selected. For example, if there is a dramatically worse difference between the MSE for feature sets of size 2 versus those of size 3, the feature set of size 3 yielding the best MSE can be selected.

Example Neural Networks

FIG. 3F shows a schematic figure of an example architecture of a neural network 350 that can be configured to execute the NARX model and/or PLS model according to aspects of the present disclosure. Neural network 350 can be implemented one or more of processor 206, or other processor as described herein. As previously alluded to, the neural network can be a dynamic artificial neural network (DNN). It is understood that separate neural networks, or the same neural network may be configured for implementing each of the PLS and/or NARX models. Neural network 350 can be used to generate one or more values for predicted values ŷ(t) of switching parameters as described herein. The neural network 351 can include one or more neuron or nodes 351. There can be a one-to one correspondence between every neuron or node 351 depicted in the schematic figure of neural network 350 and a hardware counterpart. Neural networks as described herein are not limited to the number of nodes and configuration of nodes as shown here. As used herein, a layer can include one or more neuron or neural node, with no, or at least one connection between nodes. A layer can include a subset of neurons, and/or a population of neurons. Each subset of neurons and/or population of neurons can have a different connection between neurons. The strength of the connection(s) can be based on weight matrix and/or bias vector, which can each can be fixed, modified, or varying between steps.

Neural network 350 can include at least one input layer 352. Input layer 352 can be configured to receive at least one input. Inputs can be one or more values for the switching parameters, such as processed data 319 and/or sensed data 317. Inputs can also include information on the switching device, such as its intended or actual use, chemistry, or other characteristics. Inputs can be one or more values for switching parameters which are changing (or static). Neural network 350 can include one or more output layer 354. Output layer 354 can be configured to interface with another part of the system and provide at least one solved output. For example, the output can be at least one or more values for predicted values ŷ(t) of switching parameters as described herein.

For example, neural network 350 can receive as inputs at the input layer 352 known current and/or past (in a time series, e.g. the last one, two, three, five, ten, etc.) values for one or more switching parameters. For example, neural network 350 may be configured to receive values for $V_{GS}(t)$, $V_{DS}(t−1)$, $I_{DS}(t−1)$, $V_{BD}(t−1)$, $R_{DS}(t−1)$, T (temperature). The goal of the neural network may be to compute the value for present yet unknown switching parameters, or otherwise predict expected measurements for the switching parameters. For example, the neural network 350 may be configured to generate values for $V_{DS}(t)$, $I_{DS}(t)$ and/or $V_{BD}(t)$.

Neural network one or more hidden layers 355. Hidden layers 355 may be configured to generate intermediate states for the model, such as the NARX and/or PLS model and be configured to recursively converge to a solution.

The various layers and/or neurons can have associated weights and/or gains. These weights, gains, and/or activation functions can be obtained by training the neural network. For example, training data can include values (e.g. inputs and/or outputs) associated with a variety of healthy and/or unhealthy or faulty devices, which have been tested, for example, in a variety of conditions (e.g. temperature, switching frequencies, power levels). It can also be understood that weights, gains, and/or activation functions can be updated dynamically. Accordingly, Hidden layers 355, input layer 352 and/or output layer 354 can be configured according to one or more weights and/or functions. For example, the neurons/layers can be configured based on weighted vector $w_{ij}$ and actuation function Ψ with reference to the NARX model of FIG. 3C, or the weight parameters such as weight vector w with reference to PLS model of FIG. 3D.

Example Data

Referring now to FIGS. 4A-4K and in relation to FIGS. 3A-3F, example data generated by fault detection and prediction engine 210 is shown.

FIG. 4A shows example sensed data 317 for $V_{ds}$ (with Y axis units V, and X axis units sample). The sensed data was taken at 2 Hz. and determined on-state medians 345 as determined by on-state median determination 337 in work-flow 335. As shown in FIG. 4A, the on-state median can reduce the data to one median sample per cycle (i.e. per on/off cycle).

FIGS. 4B-4C, show the residuals 347A,347B, respectively which are the differences between $R_{DS}$(ON) predicted values 346 obtained by NARX as shown in FIG. 3C, and the true values for example failed switching devices. FIG. 4B shows the residuals 347A for RDS(ON) for a first failed switching device by Mentor Graphics, which failed in open circuit in in low frequency testing. FIG. 4C shows the residuals 347B for RDS for a second failed switching device which failed by gate current leakage caused by an electrode crack.

As previously alluded to with respect to the NARX model as shown in FIG. 3C, CUSUM anomaly detection 344 is applied to the residuals 347 and changes in variance are monitored.

Merely as non-limiting examples, FIGS. 4D-4E show the CUSUM statistics, with CUSUM-variance as the selected test statistic, based on the residuals 347A, 347B shown in FIGS. 4B-C, respectively. CUSUM statistics shown include upper CUSUM statistic 348A in FIG. 4D, lower CUSUM statistic 348B in FIG. 4D, upper CUSUM statistic 348C in FIG. 4E, and lower CUSUM statistic 348D in FIG. 4E.

Based on training residuals (e.g. for healthy and/or unhealthy or faulty devices), the in-control level parameters $\mu_0$ and $\sigma_o$ are obtained. Optimal amount of shift $\delta$ and threshold h are predetermined based on the desired detection delay and risk of false alarm. The amount of shift in the process variance $\delta$ was set, for example to 5 (not shown in FIG.) and threshold h was set to 10 (not shown in FIGs) for the datasets. It is understood that the value of the amount of shift in the process variance $\delta$, and the value for the threshold h can depend on the amount of data points available after the anomaly happens (for example, the testing device may stop recording after a device is detected to fail).

Since the testing device stopped recording data when a device failed, the CUSUM statistics exceed the threshold h (the threshold not shown on the graph). For example, CUSUM statistic 348A exceeds a threshold h of 10 as shown in FIG. 4D. Thus the NARX-CUSUM workflow is able to detect incipient failures and ahead of the actual failure.

FIG. 4F shows residuals generated for Ids for a switching device where the Ids was predicted using the PLS workflow shown in FIG. 3D-3F, with CUSUM-mean as the selected test statistic for anomaly detection 372. As shown, the residual 479 mean demonstrates an upward trend.

FIG. 4G shows residuals generated for Ids for a Mentor Graphics switching device where the Ids was predicted using the PLS workflow shown in FIG. 3D-3F, with CUSUM-mean as the selected test statistic for anomaly detection 372. The device that generated these residuals shown in FIG. 4F suffered an open circuit fault.

FIG. 4H shows residuals generated for Ids for another switching device where the Ids was predicted using the PLS workflow shown in FIG. 3D-3F, with CUSUM-mean as the selected test statistic for anomaly detection 372. The device that generated these residuals shown in FIG. 4F suffered a gate current leakage fault.

FIG. 4I shows CUSUM-mean statistics ($C_t^+$ and $C_t^-$ as explained with reference to FIG. 3B) generated from the $I_D$S residual shown in the FIG. 4F. Further details on CUSUM-mean was shown with reference to FIG. 3B. The residual mean test statistic 481 of residuals 479 is generated, and as shown, it demonstrates an upward trend. The CUSUM control chart can establish when the test statistic 481 goes above and/or below the thresholds, for example, threshold 483, this may indicate an anomaly, such that a failure may occur in the future. The CUSUM algorithm is able to detect a potential failure early. In this example, an anomaly 485 occurs when the CUSUM-mean statistic crosses the threshold 483 around cycle 150, whereas a failure occurred around cycle 180. With reference to FIG. 3A and FIG. 3B, it can be understood that if the test statistic 481 is above the threshold 483 as shown in comparison 333 of FIG. 3B, the fault/no fault signal 323 can be adjusted and/or generated.

FIG. 4J shows another graph of example CUSUM-Mean statistics generated from the residuals shown in FIG. 4G for predicting faults in power electronics according to aspects of the present disclosure.

FIG. 4K shows another graph of example CUSUM-mean statistics generated from the residuals shown in FIG. 4H for predicting faults in power electronics according to aspects of the present disclosure.

FIG. 4J shows another graph of example CUSUM-mean statistics generated from the residuals shown in FIG. 4G for predicting faults in power electronics according to aspects of the present disclosure. The figure shows including upper statistic 491a and lower statistic 491b. The CUSUM window size was 200. The CUSUM $\delta$ was five standard deviations from the training data $I_D$S residual mean, and the threshold h was selected to be 10.

FIG. 4K shows another graph of example CUSUM-Mean statistics generated from the residuals shown in FIG. 4H for predicting faults in power electronics according to aspects of the present disclosure, including upper statistic 491c and lower statistic 491d. The CUSUM $\delta$ was five standard deviations from the training data Iips residual mean, and the threshold h was selected to be 10.

In example systems, training data can be generate based on real-world, laboratory testing, and/or simulation based testing scenarios. As such, models described herein can be adaptive learning models whereby the models can be updated. For example, models can be updated upon detecting novel faults. Testing can include low frequency and/or high frequency cycling of switching devices in various configurations, and at various temperatures.

In low frequency testing, there may be some time for temperatures at the devices to decrease, whereas in high frequency testing, there may not. Consequently, in high frequency testing, temperature can be almost constant, since the device's thermal time constant is large. Example temperature variations during low frequency and high frequency testing are shown in FIG. 5A (low frequency) and FIG. 5B (high frequency). Temperature run-off 521a and 521b that may be associated with a device failure is also shown in FIG. 5A and FIG. 5B.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 606, the processor 206 (FIG. 2), or the like. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608, which may, in example embodiments, include the memory 208 (FIG. 2A). For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
at least one memory storing machine-executable instructions; and
at least one processor configured to access the at least one memory and execute the machine-executable instructions to:
generate a feature set comprising qualified switching parameters to predict one or more faults of switching devices, wherein generating the feature set comprises:
iteratively ranking a level of effectiveness of each candidate switching parameter within a candidate set of candidate switching parameters; and
iteratively removing one or more candidate switching parameters within the candidate set based on the ranking, until a number of retained candidate switching parameters is consistent with a determined size of the feature set;
based on the feature set, predict a fault of a particular switching device, wherein predicting the fault comprises:

predicting, by a machine learning model, a value of a switching parameter of the particular switching device based on one or more switching parameters corresponding to the feature set; and
based on a difference between an actual value of the switching parameter and the predicted value of the switching parameter, generating a test statistic; and
in response to the test statistic identifying an onset of a fault, generate an anomaly signal based on the generated first-test statistic.

2. The system of claim 1, wherein the switching parameter comprises an on-state current $I_{ds}$ for the particular switching device.

3. The system of claim 2, wherein the value for the on-state current $I_{ds}$ is predicted using values of at least one of body-diode voltage $V_{bd}$, voltage between drain and source $V_{ds}$, and squared voltage between gate and source $V_{gs}^2$.

4. The system of claim 1, wherein the difference is part of a time-series of residuals, and wherein, when the machine-executable instructions are executed, the test statistic is generated by performing a cumulative sum (CUSUM) test on a mean of the residuals in the time-series.

5. The system of claim 1, wherein the switching parameter comprises an on-state current $I_{ds}$ for the particular switching device, the machine learning model comprises a first machine learning model, the difference comprises a first difference, the test statistic comprises a first test statistic, and wherein the at least one processor is configured to access the at least one memory and execute the machine-executable instructions to:
predict, by a second machine learning model, a value of a drain-source resistance $R_{ds}$ of the particular switching device, wherein the prediction for the drain-source resistance $R_{ds}$ is based on a present value of another switching parameter of the particular switching device and a prior value of $R_{ds}$;
determine a second difference between the predicted value of $R_{ds}$ and an actual value of drain-source resistance $R_{ds}$;
generate a second test statistic based on the second difference; and
selectively generate the anomaly signal based on the first test statistic and the second test statistic.

6. The system of claim 1, wherein the at least one processor is configured to access the at least one memory and execute the machine-executable instructions to determine on-state values for the one or more switching parameters.

7. The system of claim 1, wherein the at least one processor is configured to access the at least one memory and execute the machine-executable instructions to perform:
evaluating first subset levels of effectiveness corresponding to first subsets of the candidate switching parameters, the first subsets of the candidate switching parameters each having a first subset size less than the determined size of the feature set,
deleting a candidate switching parameter resulting in a lowest decrease in a subset level of effectiveness in each of the first subsets, wherein deleting causes generating of second subsets, each second subset having a second subset size that is one less than the first subset size;
evaluating second subset levels of effectiveness corresponding to the second subsets of the candidate switching parameters; and generating the feature set based on the second subset levels of effectiveness.

8. The system of claim 1, wherein the machine learning model is a partial least squares regression model.

9. The system of claim 1, wherein the at least one processor is further configured to execute the machine-executable instructions to: cause a physical change in one or more circuitry components of the switching device to reduce or block electrical current flowing through the one or more circuitry components in response to the test statistic identifying an onset of a fault.

10. A method, comprising:

generating a feature set comprising qualified switching parameters to predict faults of switching devices, wherein generating the feature set comprises:

iteratively ranking a level of effectiveness of each candidate switching parameter within a candidate set of candidate switching parameters; and iteratively removing one or more candidate switching parameters within the candidate set based on the ranking, until a number of retained candidate switching parameters is consistent with a determined size of the feature set;

based on the feature set, predicting a fault of a particular switching device, wherein predicting the fault comprises:

predicting, by a machine learning based model, a value of a switching parameter of the particular switching device;

based on a difference between an actual value of the switching parameter and the predicted value of the switching parameter, generating a test statistic; and in response to the test statistic identifying an onset of a fault, generating an anomaly signal related to the presence of a fault.

11. The method of claim 10, wherein the switching parameter comprises an on-state current $I_{ds}$ for the particular switching device.

12. The method of claim 11, wherein the value for the on-state current $I_{ds}$ is predicted using values of at least one of body-diode voltage $V_{bd}$, voltage between drain and source $V_{ds}$, and squared voltage between gate and source $V^2_{gs}$.

13. The method of claim 10, wherein the difference is part of a time-series of residuals, and wherein the test statistic is generated by performing a cumulative sum (CUSUM) test on a mean of the residuals in the time-series.

14. The method of claim 10, wherein the switching parameter comprises an on-state current $I_{ds}$ for the switching device, the machine learning model comprises a first machine learning model, the difference comprises a first difference, the test statistic comprises a first test statistic, the method further comprising:

predicting, using a second machine learning model, a value of a drain-source resistance $R_{ds}$ of the switching device, wherein the prediction for the drain-source resistance is based on a present value of another switching parameter of the switching device and a prior value of drain-source resistance $R_{ds}$;

determining a second difference between the predicted value of $R_{ds}$ and an actual value of drain-source resistance $R_{ds}$;

generating a second test statistic based on the second difference; and determining the fault in the particular switching device based on the first test statistic and the second test statistic.

15. The method of claim 10, wherein the switching parameter comprises an on-state current $I_{ds}$ for the switching device, the method further comprising:

predicting, using a second machine learning model, a value of a drain-source resistance $R_{ds}$ of the particular switching device, wherein the prediction for the drain-source resistance is based on a present value of another switching parameter of the particular switching device and a prior value of $R_{ds}$;

determining a second difference between the predicted value of $R_{ds}$ and an actual value of $R_{ds}$;

generating a second test statistic based on the second difference; and updating the first machine learning model based on a comparison of the second test statistic to a threshold value.

16. The method of claim 10, wherein the predicted value for the another switching parameter of the switching device is determined based on on-state values for the one or more switching parameters.

17. The method of claim 10, further comprising:

determining the number of switching parameters in the first set of switching parameters;

evaluating first subset levels of effectiveness corresponding to first subsets of the candidate switching parameters, the first subsets of the candidate switching parameters each having a first subset size less than the determined size of the feature set, deleting a candidate switching parameter resulting in a lowest decrease in a subset level of effectiveness in each of the first subsets, wherein deleting causes generating of second subsets, each second subset having a second subset size that is one less than the first subset size;

evaluating the effectiveness of subsets of switching parameters from the first set of switching parameters, the subsets of switching parameters having a subset size equal to the number of switching parameters in the first set of switching parameters less (i+1); and selecting the one or more switching parameters for the switching device to be used by the first machine learning model based on the effectiveness of the subsets of switching parameters from the first set of switching parameters.

18. The method of claim 10, wherein the one or more switching parameters comprise body-diode voltage $V_{bd}$, voltage between drain and source $V_{ds}$, and squared voltage between gate and source $V^2_{gs}$; and wherein the switching parameter is an on-state current $I_{ds}$ for the particular switching device.

19. A method for detecting faults in power inverters of electric or hybrid vehicles, comprising:

generating a feature set comprising qualified switching parameters to predict faults of switching devices, wherein generating the feature set comprises:

iteratively ranking a level of effectiveness of each candidate switching parameter within a candidate set of candidate switching parameters; and iteratively removing one or more candidate switching parameters within the candidate set based on the ranking, until a number of retained candidate switching parameters is consistent with a determined size of the feature set;

based on the feature set, predicting a fault of a particular switching device, wherein predicting the fault comprises:

predicting, by a partial least squares model a value for an on-state current $I_{ds}$ of the particular switching device; wherein the predicted value for the on-state current $I_{ds}$ is based on values of the qualified switching parameters for the particular switching device;

based on a difference between an actual value of the switching parameter and the predicted value of the switching parameter, generating a test statistic; and in response to the test statistic identifying an onset of a fault, generating an anomaly signal related to the presence of a fault.

20. The method of claim 19, wherein the first set of switching parameters comprises body-diode voltage $V_{bd}$, voltage between drain and source $V_{ds}$, voltage between gate and source $V_{gs}$, $V_{gs}*V_{ds}$, and squared voltage between gate and source $V^2_{gs}$ comprising:

evaluating mean square errors (MSE) of models based on different subsets of switching parameters from the feature set; and selecting a feature set of size i, where i is less than the number of features in the feature set, that yields a MSE that is closest in value to the MSE for a subset.

\* \* \* \* \*